US009228630B2

(12) United States Patent
Coaplen

(10) Patent No.: US 9,228,630 B2
(45) Date of Patent: Jan. 5, 2016

(54) TWIN TUBE STYLE DAMPER WITH SELECTABLE BYPASS FLOW PASSAGES

(71) Applicant: Cane Creek Cycling Components, Fletcher, NC (US)

(72) Inventor: Joshua Philip Coaplen, Asheville, NC (US)

(73) Assignee: Cane Creek Cycling Components, Fletcher, NC (US)

( * ) Notice: Subject to any disclaimer, the term of this patent is extended or adjusted under 35 U.S.C. 154(b) by 165 days.

(21) Appl. No.: 13/975,967

(22) Filed: Aug. 26, 2013

(65) Prior Publication Data

US 2014/0054122 A1  Feb. 27, 2014

Related U.S. Application Data

(60) Provisional application No. 61/693,411, filed on Aug. 27, 2012.

(51) Int. Cl.
*F16F 9/32* (2006.01)
*F16F 9/46* (2006.01)
*F16F 15/00* (2006.01)

(52) U.S. Cl.
CPC ............... *F16F 9/3257* (2013.01); *F16F 9/46* (2013.01); *F16F 15/002* (2013.01)

(58) Field of Classification Search
CPC .......... F16F 15/002; F16F 9/3257; F16F 9/46
USPC ........................................ 188/310, 314, 318
See application file for complete search history.

(56) References Cited

U.S. PATENT DOCUMENTS

| | | | | |
|---|---|---|---|---|
| 4,153,237 A * | 5/1979 | Supalla | | 267/64.15 |
| 4,275,900 A * | 6/1981 | Andreoli et al. | | 280/283 |
| 4,732,244 A * | 3/1988 | Verkuylen | | 188/318 |
| 4,834,088 A * | 5/1989 | Jeanson | | 188/298 |
| 5,172,794 A * | 12/1992 | Ward | | 188/282.8 |
| 5,431,259 A * | 7/1995 | Mizutani et al. | | 188/266.4 |
| 5,957,252 A * | 9/1999 | Berthold | | 188/314 |
| 5,996,746 A | 12/1999 | Turner et al. | | |
| 6,029,958 A * | 2/2000 | Larsson et al. | | 267/113 |
| 6,105,740 A * | 8/2000 | Marzocchi et al. | | 188/322.2 |
| 6,659,241 B2 | 12/2003 | Sendrea | | |
| 7,484,603 B2 | 2/2009 | Fox | | |
| 7,766,136 B2 * | 8/2010 | Runkel | | 188/297 |
| 8,002,092 B2 | 8/2011 | McAndrews | | |
| 8,261,893 B2 | 9/2012 | Becker et al. | | |
| 8,336,683 B2 | 12/2012 | McAndrews et al. | | |

(Continued)

*Primary Examiner* — Robert A Siconolfi
*Assistant Examiner* — Charles Poon
(74) *Attorney, Agent, or Firm* — Dority & Manning, P.A.

(57) ABSTRACT

A twin tube damper includes an inner fluid chamber, an outer fluid chamber in fluid communication with the inner fluid chamber and a first fluid circuit that is in fluid communication with the inner fluid chamber. The first fluid circuit includes a primary flow passage and a first bypass flow passage. A second fluid circuit is in fluid communication with the outer fluid chamber and with the first fluid circuit via a common flow passage. The second fluid circuit includes a primary flow passage and a second bypass flow passage. A switchable flow valve is provided for directing fluid flow between the first bypass flow passage and at least one of the common flow passage and the second bypass flow passage, and between the second bypass flow passage and at least one of the common flow passage and the first bypass flow control passage.

20 Claims, 32 Drawing Sheets

(56) References Cited

U.S. PATENT DOCUMENTS

| | | |
|---|---|---|
| 8,403,115 B2 | 3/2013 | Gartner et al. |
| 8,573,606 B1 * | 11/2013 | Kim et al. .................. 280/6.157 |
| 8,931,604 B2 * | 1/2015 | Marble ......................... 188/318 |
| 2005/0061591 A1 * | 3/2005 | Deferme ....................... 188/280 |
| 2009/0277734 A1 | 11/2009 | Cox et al. |
| 2010/0018818 A1 | 1/2010 | Ishii et al. |
| 2011/0017559 A1 | 1/2011 | Sintorn |
| 2012/0073920 A1 * | 3/2012 | Yamasaki et al. ............. 188/315 |

\* cited by examiner

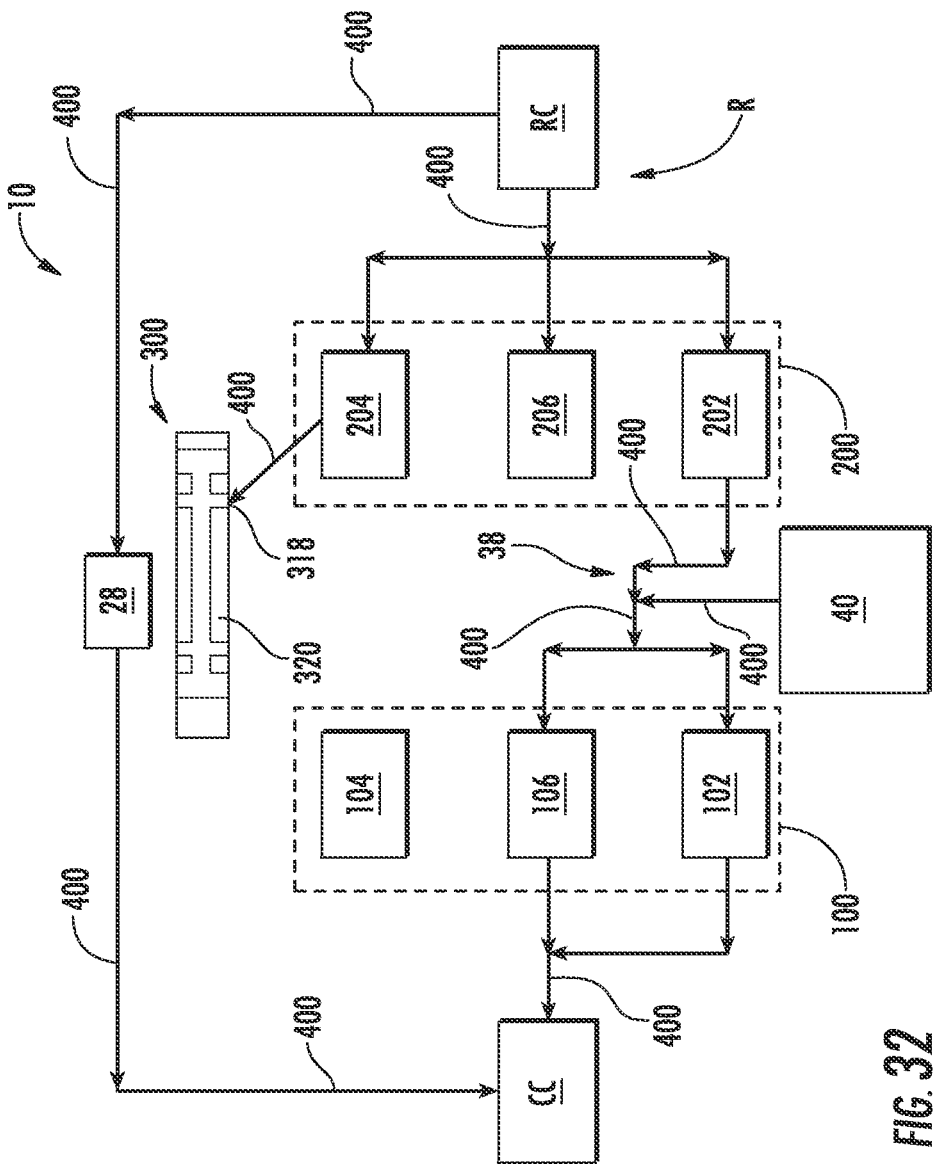

TWIN TUBE STYLE DAMPER WITH SELECTABLE BYPASS FLOW PASSAGES

FIELD OF THE INVENTION

The present invention relates to a twin tube style damper. More particularly, this invention relates to a twin tube style damper having a switchable flow valve for selectable directing fluid flow through bypass flow passages within the twin tube damper to control damping response.

BACKGROUND OF THE INVENTION

Twin tube style dampers or shock absorbers are commonly used as part of a suspension system for automobiles, trucks, motorcycles, all-terrain vehicles (ATV), bicycles, industrial equipment and the like for absorbing and dissipating energy. A conventional twin tube type damper generally includes an inner fluid chamber that is at least partially defined by an inner tube, an outer fluid chamber defined by an outer tube that is in fluid communication with the inner fluid chamber, a piston assembly that extends into the inner tube and a spring such as an air spring or a helical spring. Certain twin tube style dampers also include a fluid reservoir that is in fluid communication with the inner and the outer fluid chambers via various fluid circuits. A damping fluid fills the inner and the outer fluid chambers and a portion of the fluid reservoir.

The piston assembly includes a disk shaped piston that is disposed within the inner tube and that is attached to a piston shaft. The piston may include one or more orifices that provide for fluid communication through the piston. The damper is coupled at opposing ends to movable portions of the suspension system. As the movable portions of the suspension move relative to each other, the piston shaft and the piston translate within the inner tube between a compression stroke and a rebound stroke.

During the compression stroke, the damper works in conjunction with the spring to control the displacement and velocity of the piston shaft by metering the damping fluid from one side of the piston to the other, either by moving fluid directly through orifices in the piston or through fluid flow channels between the inner fluid chamber and the outer fluid chamber. In the case where a fluid reservoir is used, fluid is additionally displaced to the reservoir via the various fluid circuits. During the rebound stroke, the damper works against the spring to control the displacement and velocity of the piston shaft by metering the damping fluid from one side of the piston to the other, either by moving fluid directly through orifices in the piston or through fluid flow channels between the inner fluid chamber and the outer fluid chamber. In the case where a fluid reservoir is used, fluid is additionally recovered from the reservoir via the various fluid circuits.

Damping may be controlled by providing various valves and orifices within the fluid circuits through which the damping fluid flows. Damping responsiveness of a conventional damper is generally limited by the orifice size and/or by the number of the fluid circuits. For example, relatively smaller orifices restrict fluid flow through the fluid circuits, thus stiffening the damper, and relatively larger orifices allow for increased fluid flow resulting in less resistance through the fluid circuits, thus softening the damper. In certain conventional dampers, damping responsiveness may be tuned by adjusting the various damping valves.

Damping characteristics (damper tunes) of twin tube dampers are generally determined by adjustable damping valves. Adjustment of these damping valves generally requires either internal modification of the damper and/or adjustment of incremental external adjusters. In the case of internal modification, this means the damper must be at least partially disassembled, changed internally, and then reassembled for the damping to be modified. However, this is impractical to do while the damper is in use. In the case of incremental external adjustments, the adjusters can be changed without disassembling the damper. In either case, the damping characteristics during use of the damper are limited to the single characteristic damping tune determined by the chosen adjustment of the damper.

This single damper tune may not be the desired damper tune for a certain range of conditions/situations experienced during use of the damper. For example, in high performance applications such as when used on a motorcycle, ATV, snowmobile, bicycle, automobile, truck and/or when used for racing applications, the terrain, speed, and environmental conditions may require various or changing damping characteristics. Therefore, an improved twin tube damper that allows at least two predefined damping tunes, each quickly and possibly remotely accessible during use of the damper would be useful. In addition, it would be further useful if each damper tune was itself fully definable either externally or internally, such that compression stroke damping and the rebound stroke damping were each altered as desired between the various defined damping characteristics.

SUMMARY OF THE INVENTION

Additional objects and advantages of the invention will be set forth in part in the following description, or may be apparent from the description, or may be learned through practice of the invention.

One exemplary embodiment of the present invention includes a twin tube damper. The twin tube damper comprises an inner fluid chamber, an outer fluid chamber that is in fluid communication with the inner fluid chamber and a first fluid circuit that is in fluid communication with the inner fluid chamber. The first fluid circuit comprises a primary flow passage and a first bypass flow passage. A second fluid circuit is in fluid communication with the outer fluid chamber. In addition, the second fluid circuit is in fluid communication with the first fluid circuit via a common flow passage that fluidly links the second fluid circuit to the first fluid circuit. The second fluid circuit comprises a primary flow passage and a second bypass flow passage. The damper further includes a switchable flow valve for directing fluid flow between the first bypass flow passage and at least one of the common flow passage and the second bypass flow passage, and between the second bypass flow passage and at least one of the common flow passage and first bypass flow control passage.

In another embodiment of the present invention, a twin tube style damper is provided. The twin tube damper comprises an inner fluid chamber, an outer fluid chamber that is in fluid communication with the inner fluid chamber, and a first fluid circuit that is in fluid communication with the inner fluid chamber. The first fluid circuit comprises a primary flow passage and a first bypass flow passage. A second fluid circuit is in in fluid communication with the outer fluid chamber. The second fluid circuit is in fluid communication with the first fluid circuit via a common flow passage that fluidly links the second fluid circuit to the first fluid circuit. The second fluid circuit comprises a primary flow passage and a second bypass flow passage. A fluid reservoir is in direct fluid communication and/or fluidly linked with the common flow passage. A piston travels within the inner fluid chamber so as to move a damping fluid from one side of the piston to the other, either by moving fluid directly through orifices in the piston or through the first and second fluid circuits between the inner fluid chamber and the outer fluid chamber. Fluid enters the fluid reservoir during the compression stroke, and is recovered from the reservoir during the rebound stroke. A switchable flow valve is fluidly linked to the fluid reservoir. The switchable flow valve is configured to direct fluid flow between the fluid reservoir and at least one of the first bypass flow passage or the second bypass flow passage.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 32 provides a flow diagram of the damper as show in FIG. 30, during a rebound stroke.

DETAILED DESCRIPTION

Figure 1:
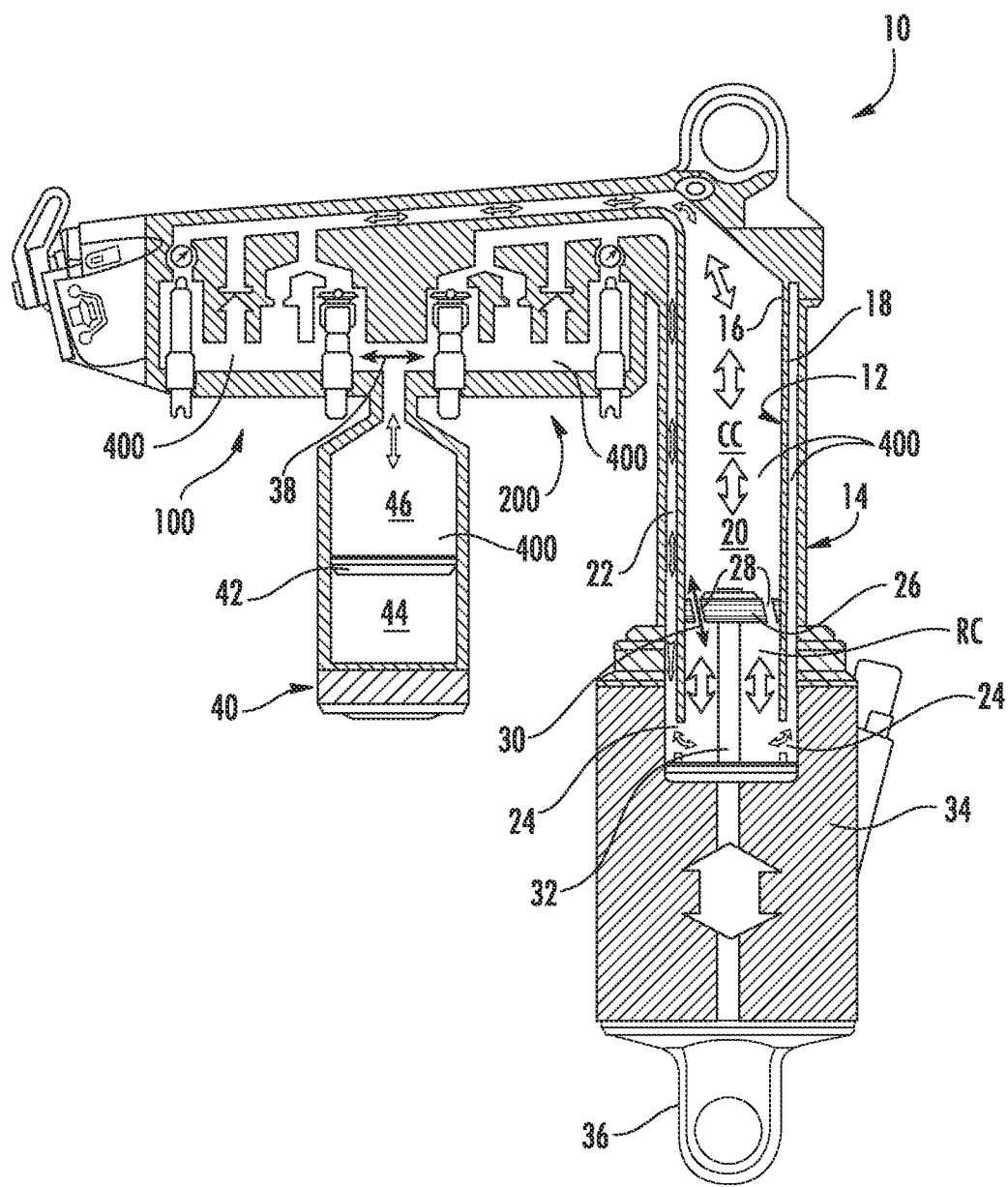
FIG. 1 illustrates a perspective view of an example of a twin tube style damper used in various embodiments of the present invention.

The present invention relates to a twin tube damper having a first bypass flow passage, a second bypass flow passage and a switchable flow valve for selectably switching the first bypass flow passage and the second bypass flow passage between a least restrictive flow setting and a most restrictive flow setting, thus modifying the damping effect of the damper by increasing and decreasing a flow volume within the damper. For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

Referring now to the drawings, wherein like numerals refer to like components, FIG. 1 illustrates an exemplary twin tube damper 10, herein referred to as "damper 10", according to one embodiment of the present invention. As shown, the damper 10 generally includes an inner tube 12 that is generally encased within an outer tube 14. The inner tube 12 includes an inner surface 16 and an outer surface 18. The inner tube 12 at least partially defines an inner fluid chamber 20 within the damper 10. An outer fluid chamber 22 is at least partially defined between the outer surface 18 of the inner tube 16 and the inner surface of the outer tube 14. The inner fluid chamber 20 is in fluid communication with the outer fluid chamber 22 via one or more openings or orifices 24 that extend through the inner tube 12. A non-compressible damping fluid 400 such as a hydraulic fluid fills the inner and outer fluid chambers 20, 22.

The damper 10 further includes a generally disk shaped piston 26 that is moveable within the inner fluid chamber 20. The piston 26 forms a seal against the inner wall 16 of the inner tube 12. In particular embodiments, the piston 26 includes one or more orifices 28 which define one or more flow paths 30 through the piston 26. The piston 26 is connected to one end of a piston shaft 32. The piston shaft 32 extends from the piston 26 through a portion of the inner tube 12 and out of the inner fluid chamber 20 through a sealed opening 34 in the damper 10. A second end of the piston shaft 32 may be connected to a coupling feature 36. The coupling feature 36 may be connected to a portion of a suspension system (not shown). For example, the coupling feature 36 may be connected to a suspension system of an automobile, a truck, a motorcycle, a bicycle, an all-terrain vehicle or the like.

For the purposes of illustration, it is convenient to define a compression chamber CC and a rebound chamber RC. The compression chamber CC is defined as the volume, filled with damping fluid 400, between the piston 26 and the first fluid circuit 100. The compression chamber CC is at a higher pressure than the remainder of the damper 10 during the compression stroke C. The rebound chamber RC is defined as the volume, filled with damping fluid 400, between the piston 26 and the second fluid circuit 200. The rebound chamber RC is at a higher pressure than the remainder of the damper 10 during the rebound stroke R. The actual volume of both of compression chamber CC and the rebound chamber RC depends on the position of the piston 26 in the damper 10. In FIG. 1, the compression chamber CC consists of the volume of the inner fluid chamber 20 that is above the piston 26 and volume connecting the inner fluid chamber 20 to the first fluid circuit 100. The rebound Chamber RC consists of the volume of the inner fluid chamber 20 that is below the piston 26, the entire outer fluid chamber 22, and volume connecting the outer fluid chamber 22 to the second fluid circuit 200.

In one embodiment, as shown in FIG. 1, the inner fluid chamber 20 is in fluid communication with a first fluid circuit 100. The first fluid circuit 100 and the outer fluid chamber 22 are in fluid communication with a second fluid circuit 200. The first and second fluid circuits 100, 200 are fluidly linked or in fluid communication via a common flow passage 38. During a compression stroke C, the piston 26 slides within the inner chamber 20 away from the openings 24 in the inner tube 12, reducing the volume of the compression chamber CC and increasing the volume of the rebound chamber RC. During a rebound stroke R, the piston 26 slides within the inner chamber 20 towards the openings 24 in the inner tube 12, reducing the volume of the rebound chamber RC and increasing the volume of the compression chamber CC. In particular embodiments, the damper 10 also may include a fluid reservoir 40. The fluid reservoir 40 may be fluidly linked to the first fluid circuit 100 and/or the second fluid circuit 200 via the common flow passage 38. The fluid reservoir 40 may include a movable piston 42 that separates a gas or spring chamber 44 from a fluid chamber 46. In particular embodiments, the fluid chamber 46 is fluidly linked to the common flow passage 38. The damping fluid 400 may be directed into and/or out of the fluid reservoir 40 during the compression stroke C and/or the rebound stroke R allowing for expansion/contraction of the damping fluid 400 within the damper 10, and displacement of the damping fluid 400 by the piston shaft 32 as it extends into and retracts from the inner fluid chamber 20.

Figure 2:
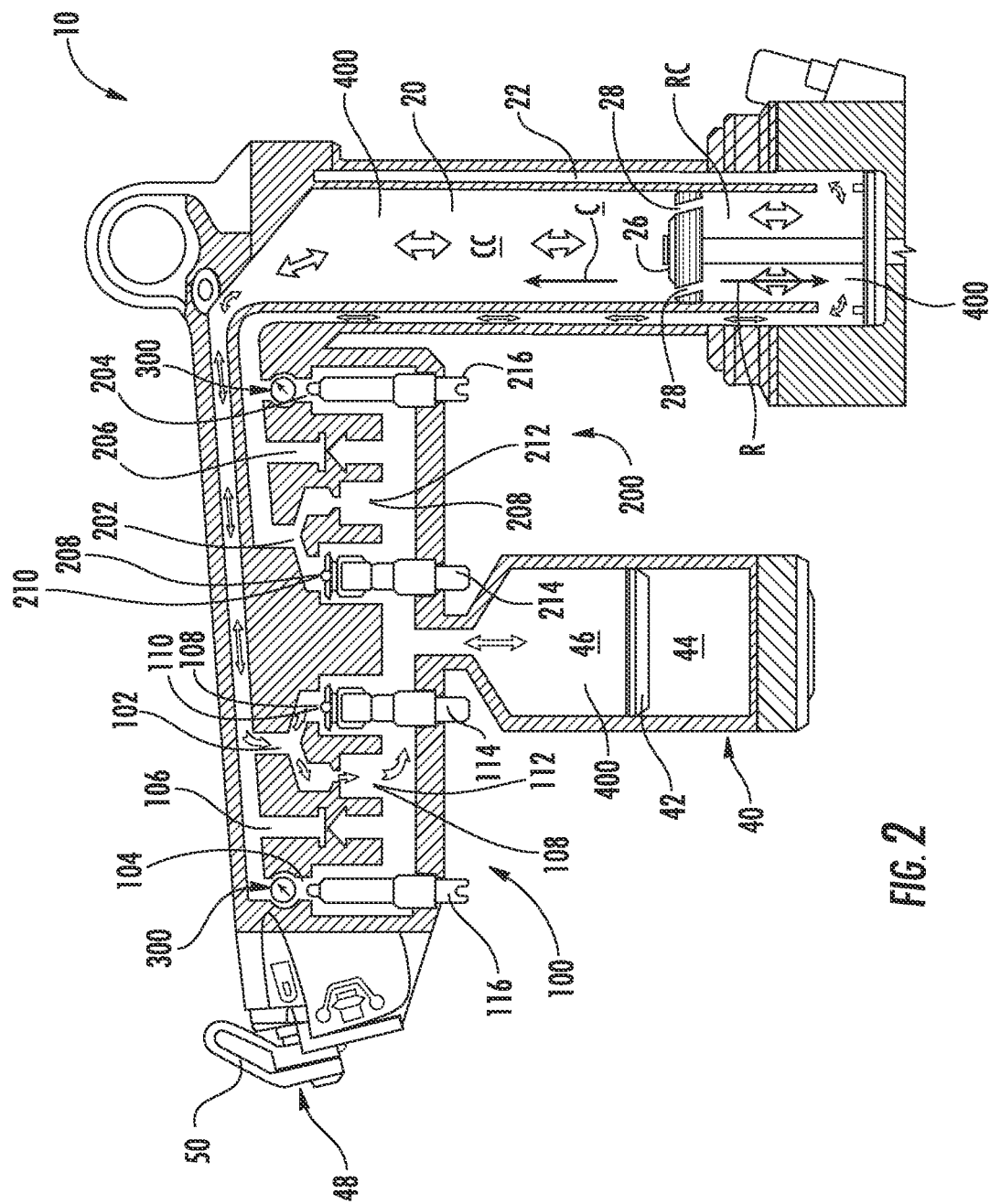
FIG. 2 provides an enlarged cross sectional side view of a portion of the damper as shown in FIG. 1, according to various embodiments of the present invention.

FIG. 2 provides an enlarged cross sectional side view of a portion of the damper 10 as shown in FIG. 1, including the first and second fluid circuits 100, 200. As shown in FIG. 2, the first fluid circuit 100 includes a primary flow passage 102 and a first bypass flow passage 104. As shown, the primary flow passage 102 is in parallel with the first bypass flow passage 104. The second fluid circuit 200 includes a primary flow passage 202 and a second bypass flow passage 204. The primary flow passage 202 is in parallel with the second bypass flow passage 204.

In particular embodiments, as shown in FIG. 2, the first fluid circuit 100 may include a unidirectional flow passage 106 that is parallel to the primary flow passage 102 and the first bypass flow passage 104. The unidirectional flow passage 106 allows for fluid flow in one direction only. For example, during a compression stroke of the damper 10, the unidirectional flow passage 106 prevents or restricts the damping fluid 400 from flowing from the compression chamber CC towards the common flow passage 38. However, during a rebound stroke of the damper 10, the unidirectional flow passage 106 allows the damping fluid 400 to flow from the common flow passage 38 towards the compression chamber CC. As shown in FIG. 2, the primary flow passage 102 of the first fluid circuit 100 may comprise multiple flow paths 108. For example, in particular configurations the primary flow passage 102 may include a first flow path 110 and a second flow path 112.

In particular embodiments, as shown in FIG. 2, a pressure actuated or blow off valve 114 such as a spring valve may be disposed within the primary flow passage 102 of the first fluid circuit 100. The pressure actuated valve 114 may control fluid pressure within the primary flow passage 102, thus affecting damping characteristics of the damper 10 and/or preventing over pressurization of the damper 10. For example, the pressure actuated valve 114 may be set to block or restrict fluid flow from the compression chamber CC to the common flow passage 38 during a compression stroke until a threshold pressure within the primary flow passage 102 has been reached. Once the threshold pressure within the primary flow passage 102 is realized, the pressure actuated valve 114 will at least partially open, thus allowing fluid to flow past the pressure actuated valve 114. The pressure actuated valve 114 may be preset to actuate at a particular threshold pressure or may be externally adjustable. The pressure actuated valve 114 may be disposed in either of the first flow path 110 or the second flow path 112 of the primary flow passage 102.

In particular embodiments, the first fluid circuit 100 may further include an adjustable flow restrictor 116 disposed within the first bypass flow passage 104. The adjustable flow restrictor 116 generally may include a threaded portion that extends through the body of the damper 10. The adjustable flow restrictor 116 may be adjusted incrementally to fine tune the flow of the damping fluid 400 passing through the first bypass flow passage 104.

In particular embodiments, as shown in FIG. 2, the second fluid circuit 200 may include a unidirectional flow passage 206 that is parallel to the primary flow passage 202 and the second bypass flow passage 204. The unidirectional flow passage 206 allows for fluid flow in one direction only. For example, during the compression stroke of the damper 10, the unidirectional flow passage 206 allows the damping fluid 400 to flow from the common flow passage 38 towards the rebound chamber RC. However, during the rebound stroke, the unidirectional flow passage 206 prevents or restricts the damping fluid 400 from flowing from the rebound chamber RC to the common flow passage 38. As shown in FIG. 2, the primary flow passage 202 of the second fluid circuit 200 may comprise multiple flow paths 208. For example, in particular configurations the primary flow passage 202 may include a first flow path 210 and a second flow path 212.

In particular embodiments, as shown in FIG. 2, a pressure actuated or blow off valve 214 such as a spring valve may be disposed within the primary flow passage 202 of the second fluid circuit 200. The pressure actuated valve 214 may control fluid pressure within the primary flow passage 202, thus affecting damping characteristics of the damper 10 and/or preventing over pressurization of the damper 10. For example, the pressure actuated valve 214 may be set or adjusted to block or restrict fluid flow from the rebound chamber RC to the common flow passage 38 during a rebound stroke until a predetermined pressure threshold within the primary flow passage 202 has been reached. Once the pressure threshold within the primary flow passage 202 is realized, the pressure actuated valve 214 will at least partially open, thus allowing fluid to flow past the pressure actuated valve 214. The pressure actuated valve 214 may be set to actuate at a particular threshold pressure or may be externally adjustable. The pressure actuated valve 214 may be disposed in either the first flow path 210 or the second flow path 212 of the primary flow passage 202.

In particular embodiments, as show in FIG. 2, the second fluid circuit 200 may include an adjustable flow restrictor 216 disposed within the second bypass flow passage 204. The adjustable flow restrictor 216 generally may include a threaded portion that extends through a main body of the damper 10. The adjustable flow restrictor 216 may be adjusted incrementally to fine tune a flow of the damping fluid 400 through the second bypass flow passage 204.

During a compression stroke C, the piston 26 translates within the inner tube 12 so as to move a portion of the damping fluid 400 from the compression chamber CC towards the first fluid circuit 100. During a compression stroke C, a portion of the damping fluid 400 may flow from the compression chamber CC through the orifices 28 defined within the piston 26 towards the rebound chamber RC. During the rebound stroke R, the piston 26 translates within the inner tube 12 so as to move a portion of the damping fluid 400 from the rebound chamber RC towards the second fluid circuit 200. During a rebound stroke R, a portion of the damping fluid 400 may flow from the rebound chamber RC through the orifices 28 defined within the piston 26 towards the compression chamber CC.

In various embodiments, the damper 10 comprises a switchable flow valve 300 that is fluidly linked to each of the first bypass flow passage 104 and the second bypass flow passage 204. In one embodiment, the switchable flow valve 300 is configured to direct or route the damping fluid 400 between the first bypass flow passage 104 and the common flow passage 38, and between the second bypass flow passage 204 and the common flow passage 38. In one embodiment, the switchable flow valve 300 is configured to direct or route the damping fluid 400 directly between the first bypass flow passage 104 and the fluid reservoir 40, and directly between the second bypass flow passage 204 and the fluid reservoir 40. In other words, the first bypass flow passage 104 and the second bypass flow passage 204 are each directly fluidly linked to fluid reservoir 40.

The switchable flow valve 300 generally includes one or more switchable flow settings that range from a least restrictive or open setting to a most restrictive or closed setting. The least restrictive setting generally corresponds to a maximum flow condition through each of the bypass flow passages 104, 204 and into the common flow passage 38 and/or the fluid reservoir 40. The most restrictive flow setting generally corresponds to a minimum or no-flow flow condition through each or at least one of the first bypass flow passage 104 and the second bypass flow passage 204 and/or the fluid reservoir 40. Although the damper 10 is described as having a single switchable flow valve 300, it should be obvious to one of ordinary skill that the damper 10 may include a plurality of switchable flow valves configured similarly and having similar function within the damper 10 as presented herein.

As shown in FIG. 2, the damper further comprises an external actuating mechanism 48 that is coupled to the switchable flow valve 300. The external actuating mechanism 48 may include a lever or switch 50. The external actuating mechanism 48 may be manually, mechanically, pneumatically, hydraulically, or electrically actuatable. For example, the external actuating mechanism 48 may be actuated or turned by the hand of an operator, by a wire, cable, or other mechanical means or by an electric, pneumatic or hydraulic solenoid.

Figure 3:
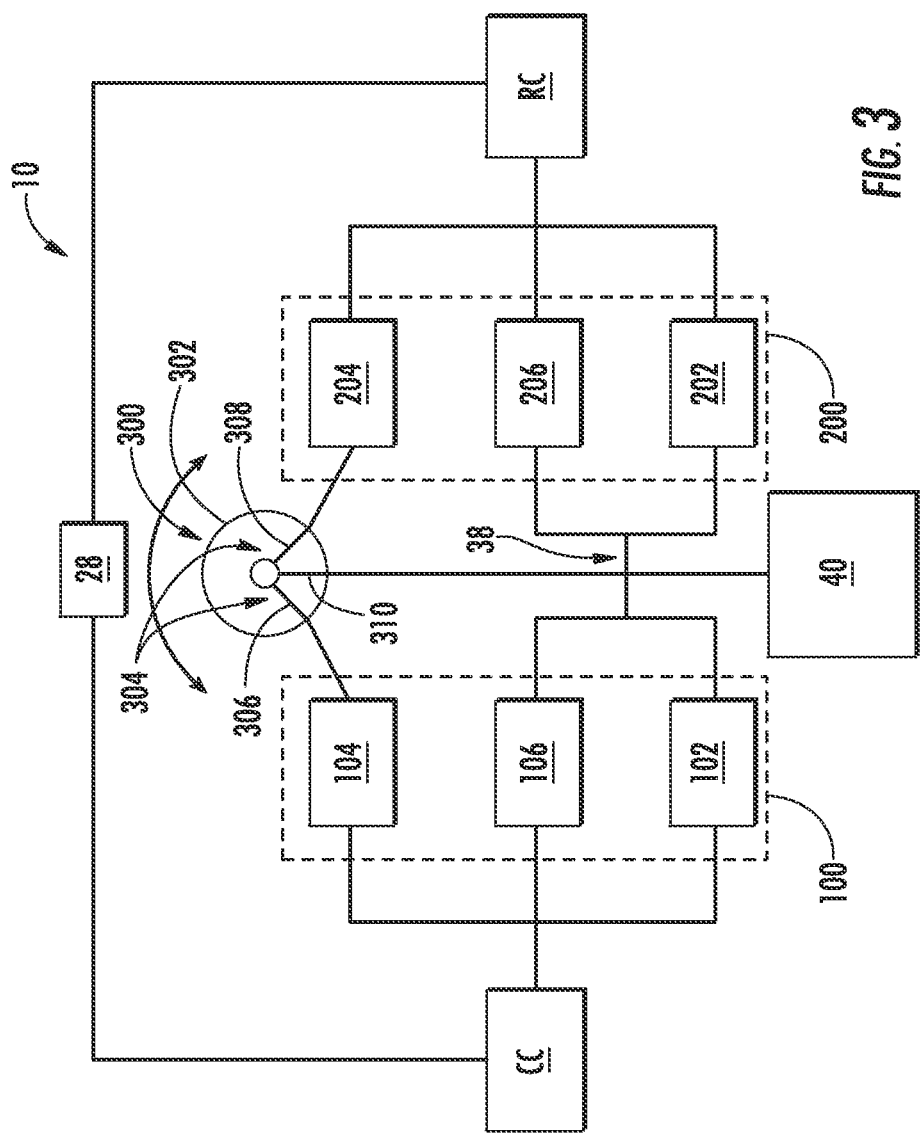
FIG. 3 provides a schematic of an exemplary damper including a switchable flow valve set in a least restrictive flow setting, according to various embodiments of the present invention.

FIG. 3 provides a schematic of the damper 10 according to various embodiments of the present invention. Particularly, FIG. 3 shows how each component may be fluidly linked within the damper 10 in various embodiments of the present invention. In particular embodiments, the switchable flow valve 300 comprises a spool valve 302. The spool valve 300 may be a rotatable type, a linearly actuated type or any type of spool valve suitable to carry out the invention as described herein. A plurality of fluid ports or passages 304 are defined within the switchable flow valve 300. Each of the fluid ports 304 may be fluidly linked to one another to allow for fluid flow into, within and/or through the switchable flow valve 300. In one embodiment, the switchable flow valve 300 comprises a first fluid port 306, a second fluid port 308 and a third fluid port 310. The third fluid port 310 is fluidly linked with each of the first fluid port 306 and the second fluid port 308. In one embodiment, as shown in FIG. 3, the first fluid port 306 is in fluid communication with the first bypass flow passage 104, the second fluid port 308 is in fluid communication with the second bypass flow passage 204 and the third fluid port 310 is in fluid communication with the common flow passage 38 with the switchable flow valve 300 set to a least restrictive or open setting.

Figure 4:
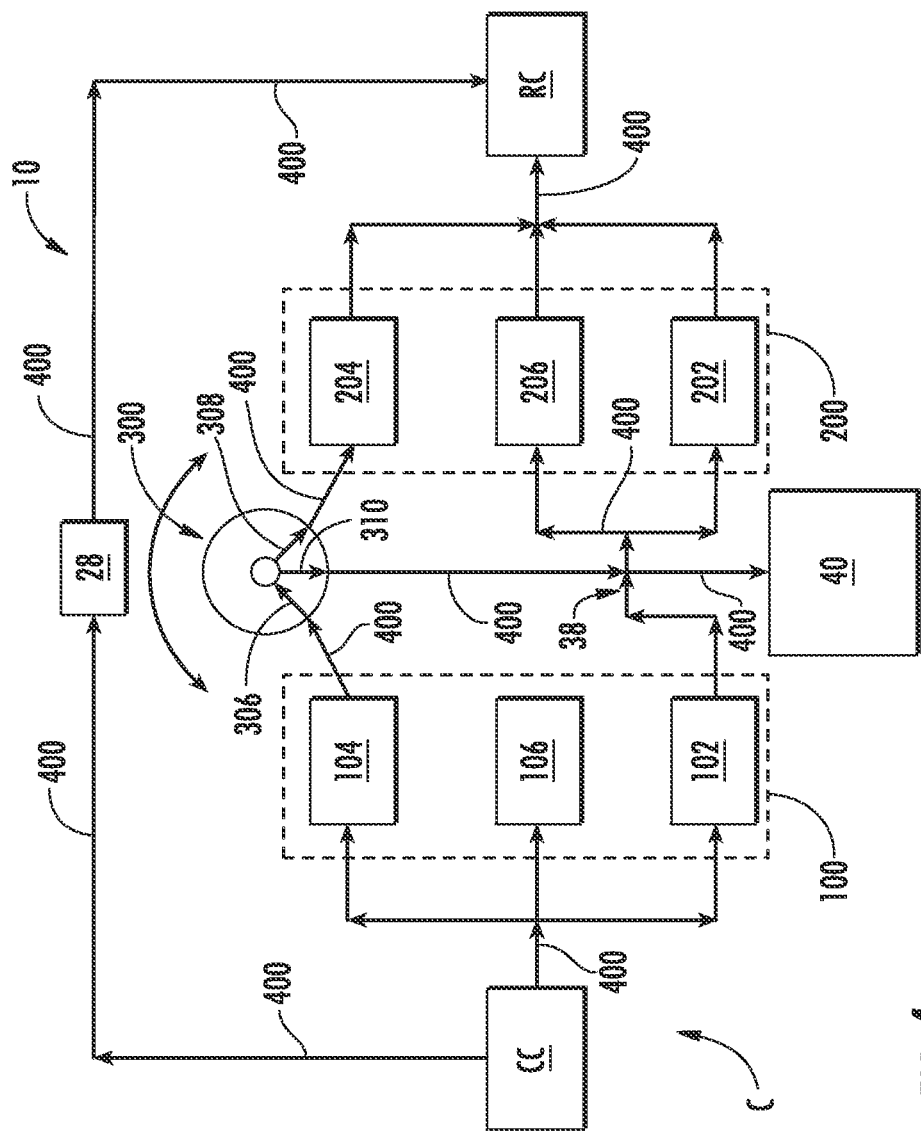
FIG. 4 provides a flow diagram of the damper as shown in FIG. 3, during a compression stroke.
Figure 5:
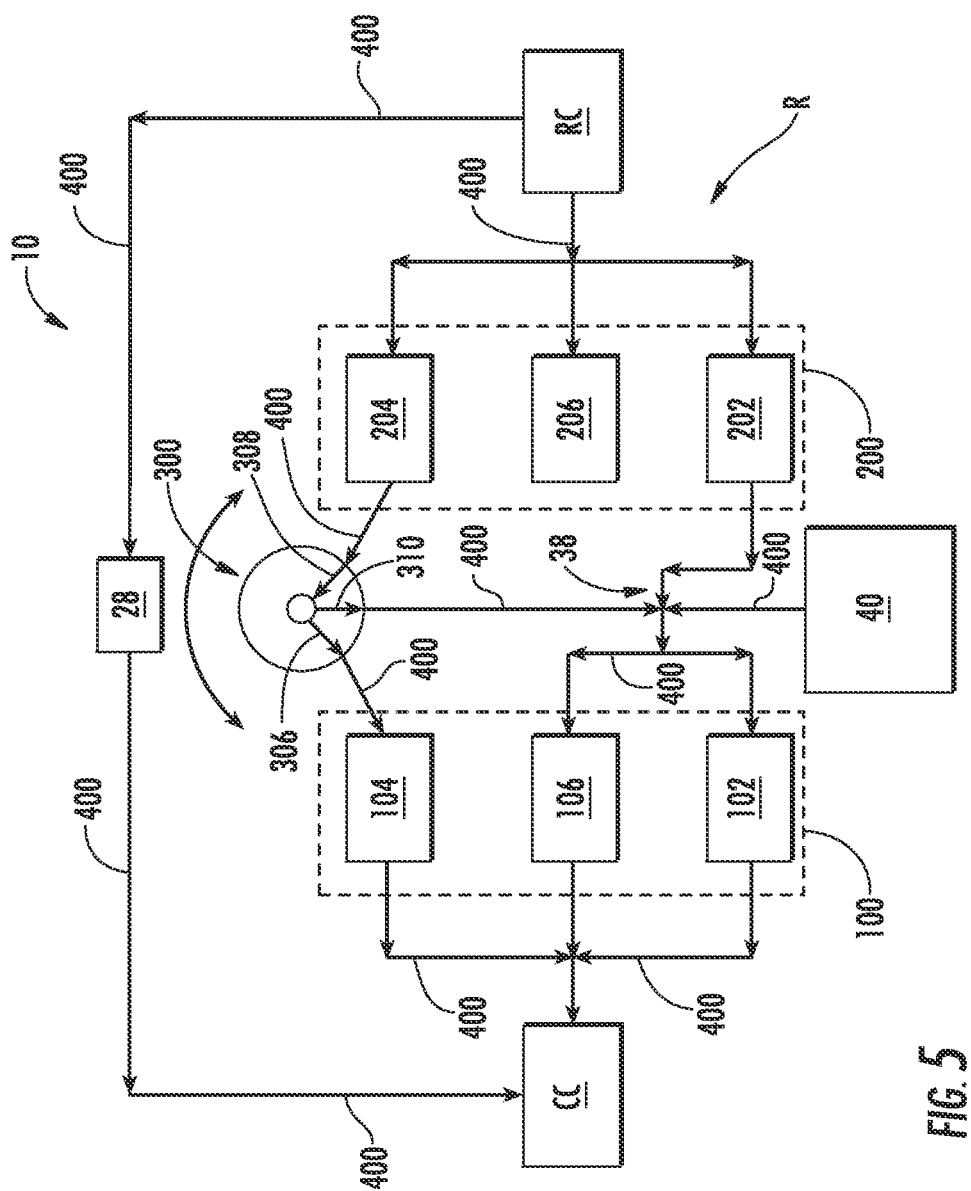
FIG. 5 provides a flow diagram of the damper as show in FIG. 3, during a rebound stroke.

FIG. 4 is a flow diagram of the damper 10 as shown in FIG. 3, during the compression stroke C with the switchable flow valve 300 set to a least restrictive or open setting, according to one embodiment of the present invention. FIG. 5 is a flow diagram of the damper 10 as show in FIG. 3 during the rebound stroke R, according to one embodiment of the present invention. As described and as illustrated in the various flow diagram FIGs. presented herein, the direction of flow of the damping fluid 400 during the compression stroke C and the rebound stroke R is illustrated by lines with arrows.

During the compression stroke C, as shown in FIG. 4, a portion of the damping fluid 400 may flow from the compression chamber CC through the orifices 28 in the piston 26 (FIG. 1) towards the rebound chamber RC. A portion of the damping fluid 400 flows from the compression chamber CC through the primary flow passage 102 and into the common flow passage 38. A portion of the damping fluid 400 flows in parallel with the primary flow passage 102 through the first bypass flow passage 104 and into the common flow passage 38 via the switchable flow valve 300, particularly via the first fluid port 306 and the third fluid port 310.

A portion of the damping fluid 400 may then flow into or towards the fluid reservoir 40 and/or may flow into the second fluid circuit 200. For example, a portion of the damping fluid 400 may flow through the unidirectional flow passage 206 and/or through the primary flow passage 202 of the second fluid circuit 200 towards the rebound chamber RC. In operation, at least some of the damping fluid 400 may bleed from the second fluid port 308 and flow into the second bypass flow passage 204 from the switchable flow valve 300 towards the rebound chamber RC.

During the rebound stroke R, as shown in FIG. 5, a portion of the damping fluid 400 may flow from the rebound chamber RC through the orifices 28 (FIG. 1) in the piston 26 (FIG. 1) towards the compression chamber CC. A portion of the damping fluid 400 flows through the primary flow passage 202 and into the common flow passage 38. A portion of the damping fluid 400 flows in parallel with the primary flow passage 202 through the second bypass flow passage 204 and into the common flow passage 38 via the switchable flow valve 300, particularly via the second fluid port 308 and the third fluid port 310.

A portion of the damping fluid 400 may then flow out of or away from the fluid reservoir 40 and/or may flow into or towards the first fluid circuit 100. A portion of the damping fluid 400 may flow through the unidirectional flow passage 106 and/or through the primary flow passage 102 of the first fluid circuit 100 towards the compression chamber CC. At least some of the damping fluid 400 may bleed from the first fluid port 308 and flow into the first bypass flow passage 104 from the switchable flow valve 300.

Figure 6:
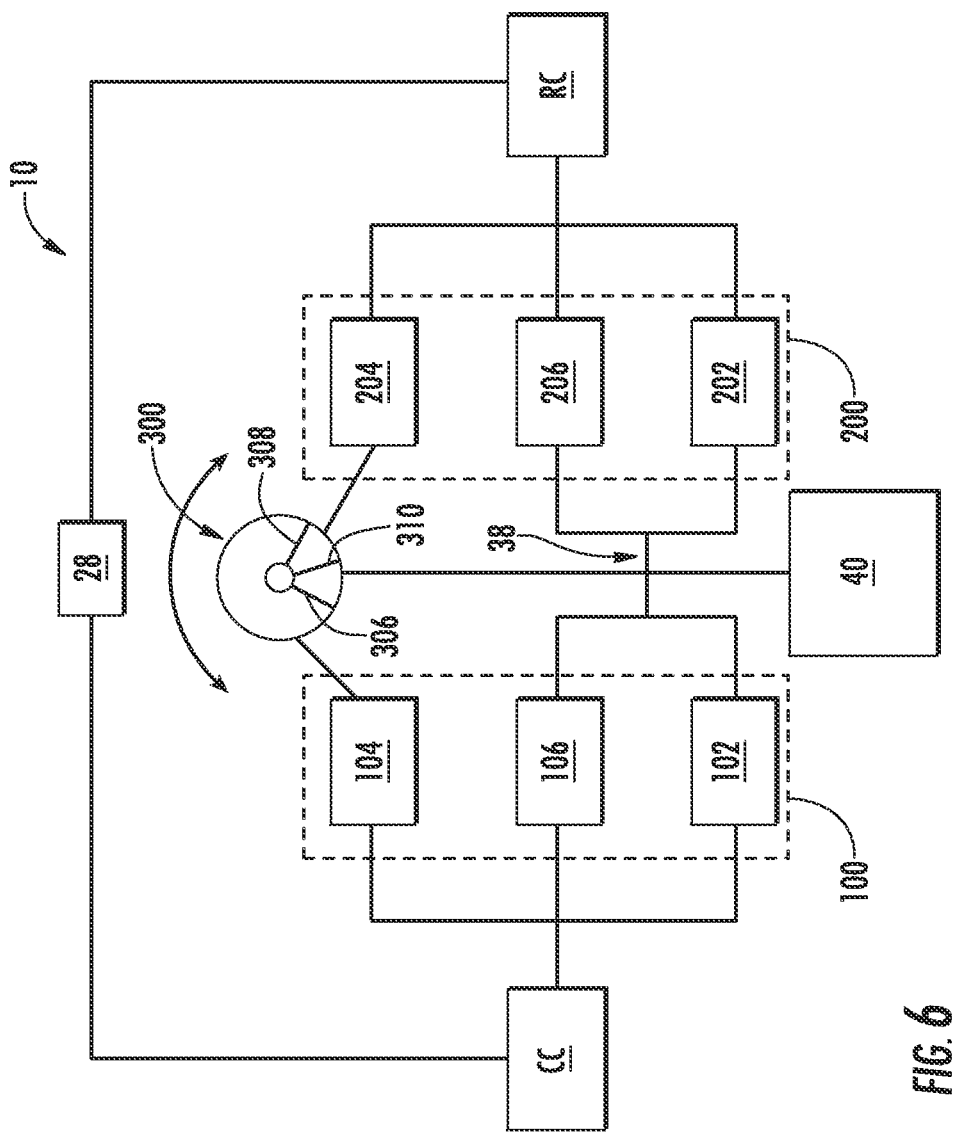
FIG. 6 provides a schematic of the damper as shown in FIG. 3, with the switchable flow valve set to a most restrictive flow setting according to one embodiment of the present invention.

FIG. 6 is a schematic of the damper 10 as shown in FIG. 3, with the switchable flow valve 300 set to a most restrictive or closed setting according to one embodiment of the present invention. As shown in FIG. 6, the switchable flow valve 300 may be rotated or otherwise actuated such that each of the first fluid port 306, the second fluid port 308 and the third fluid port 310 is blocked or at least partially blocked. This setting at least partially blocks or shuts off both the first bypass flow passage 104 and the second bypass flow passage 204 within the damper 10.

Figure 7:
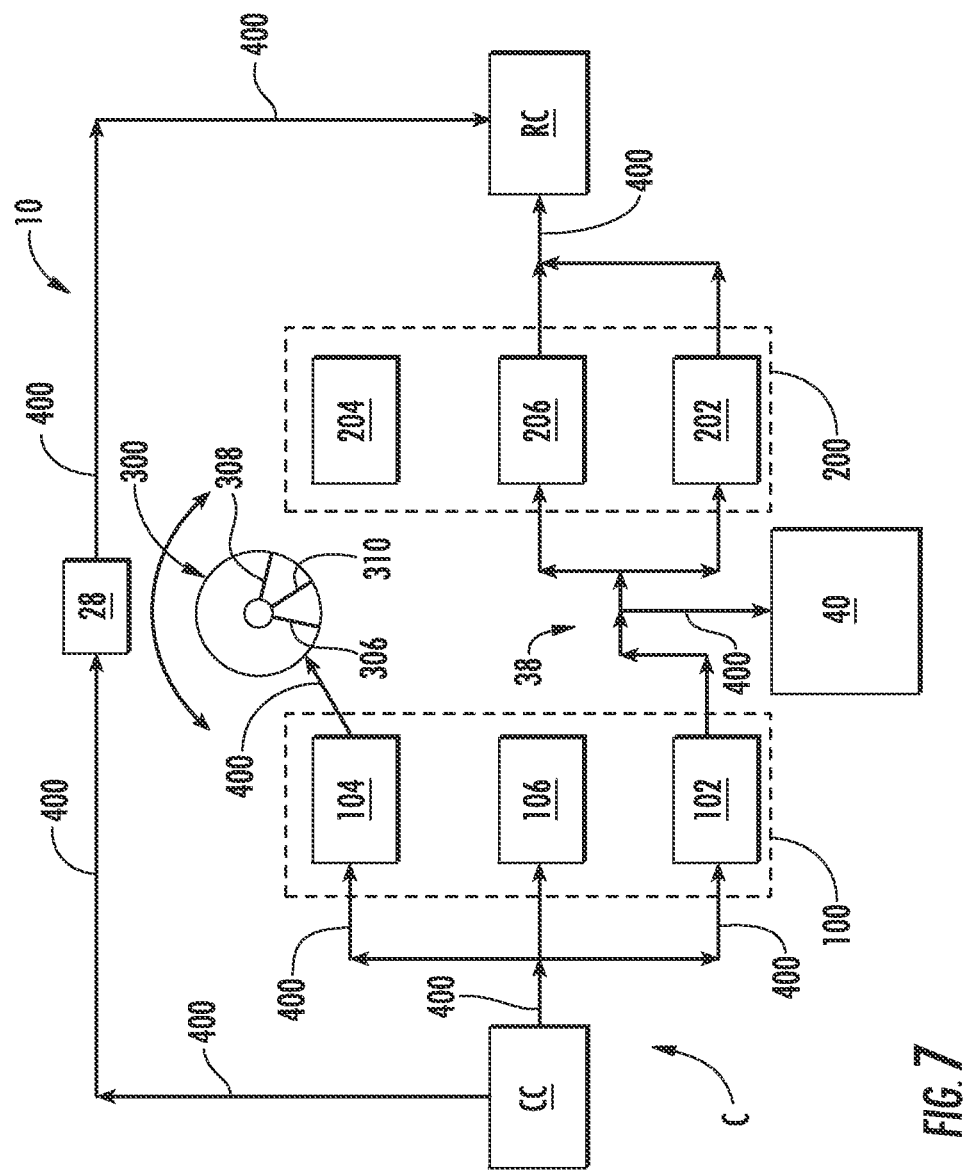
FIG. 7 provides a flow diagram of the damper as shown in FIG. 6, during a compression stroke.
Figure 8:
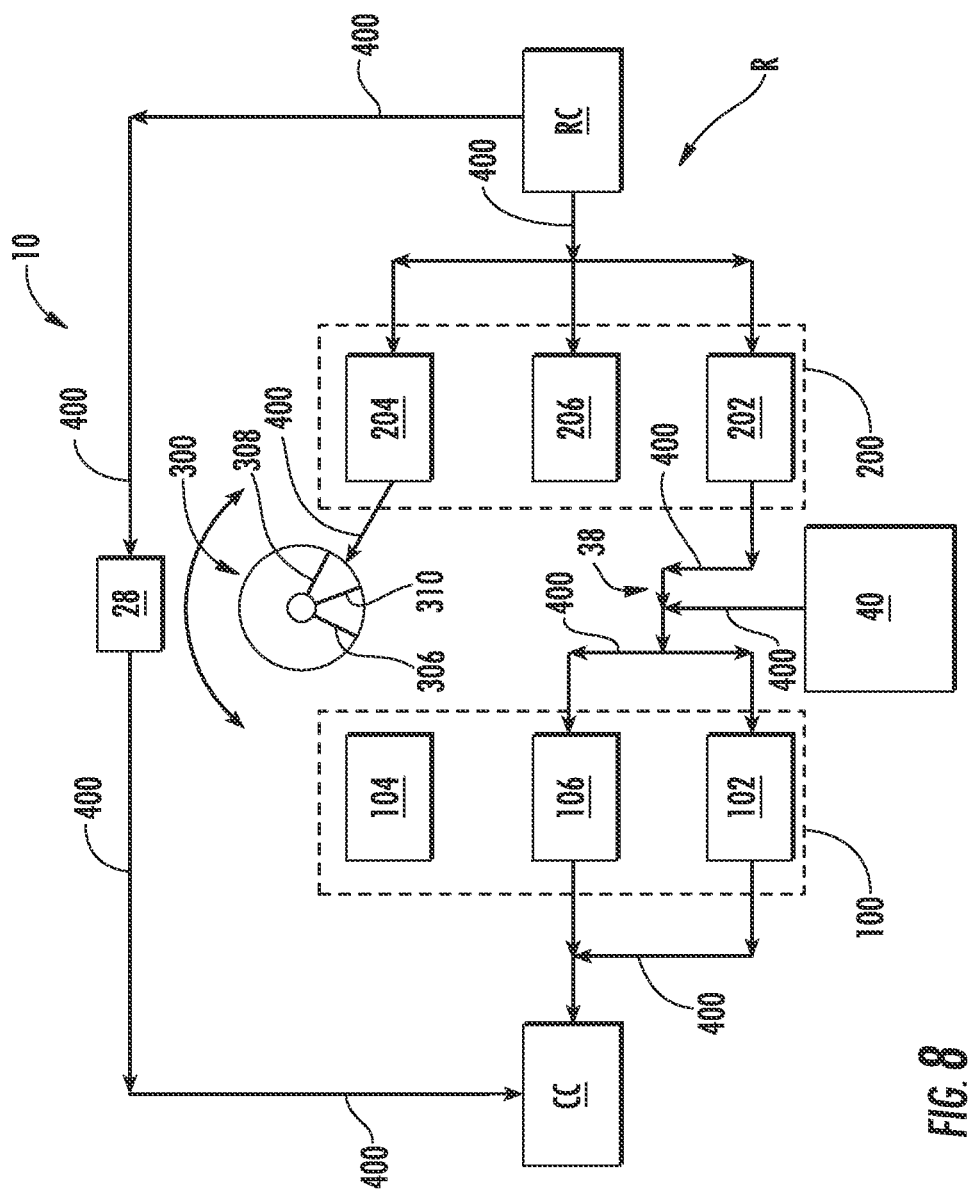
FIG. 8 provides a flow diagram of the damper as show in FIG. 6, during a rebound stroke.

FIG. 7 provides a flow diagram of the damper 10 as shown in FIG. 6, during the compression stroke C, and FIG. 8 provides a flow diagram of the damper 10 as show in FIG. 6, during the rebound stroke R. As shown in FIG. 7, a portion of the damping fluid 400 may flow from the compression chamber CC through the orifices 28 in the piston 26 (FIG. 1) towards the rebound chamber RC. A portion of the damping fluid 400 is directed from the compression chamber CC towards the first fluid circuit 100. As shown in FIG. 7, the switchable flow valve 300 prevents or mostly restricts the damping fluid 400 from flowing through the first bypass passage 104 and into the common flow passage 38. As a result, a portion of the damping fluid 400 is primarily directed through the primary flow passage 102 and into the common flow passage 38. A portion of the damping fluid 400 may flow into the fluid reservoir 40 and/or may be routed towards the second fluid circuit 200. A portion of the damping fluid 400 may be directed through the unidirectional flow passage 206 and/or through the primary flow passage 202 towards the rebound chamber RC.

As shown in FIG. 8, during the rebound stroke R, a portion of the damping fluid 400 may flow from the rebound chamber RC through the orifices 28 (FIG. 1) in the piston 26 (FIG. 1) towards the compression chamber CC. A portion of the damping fluid 400 is directed from the rebound chamber RC towards the second fluid circuit 200. The switchable flow valve 300 prevents or mostly restricts the damping fluid 400 from flowing through the second bypass passage 204 and into the common flow passage 38. As a result, a portion of the damping fluid 400 is directed through the primary flow passage 202 and into the common flow passage 38. A portion of the damping fluid 400 may flow out of the fluid reservoir 40 and/or may be routed towards the first fluid circuit 100. A portion of the damping fluid 400 may flow through the unidirectional flow passage 106 and/or through the primary flow passage 102 towards the compression chamber CC.

Figure 9:
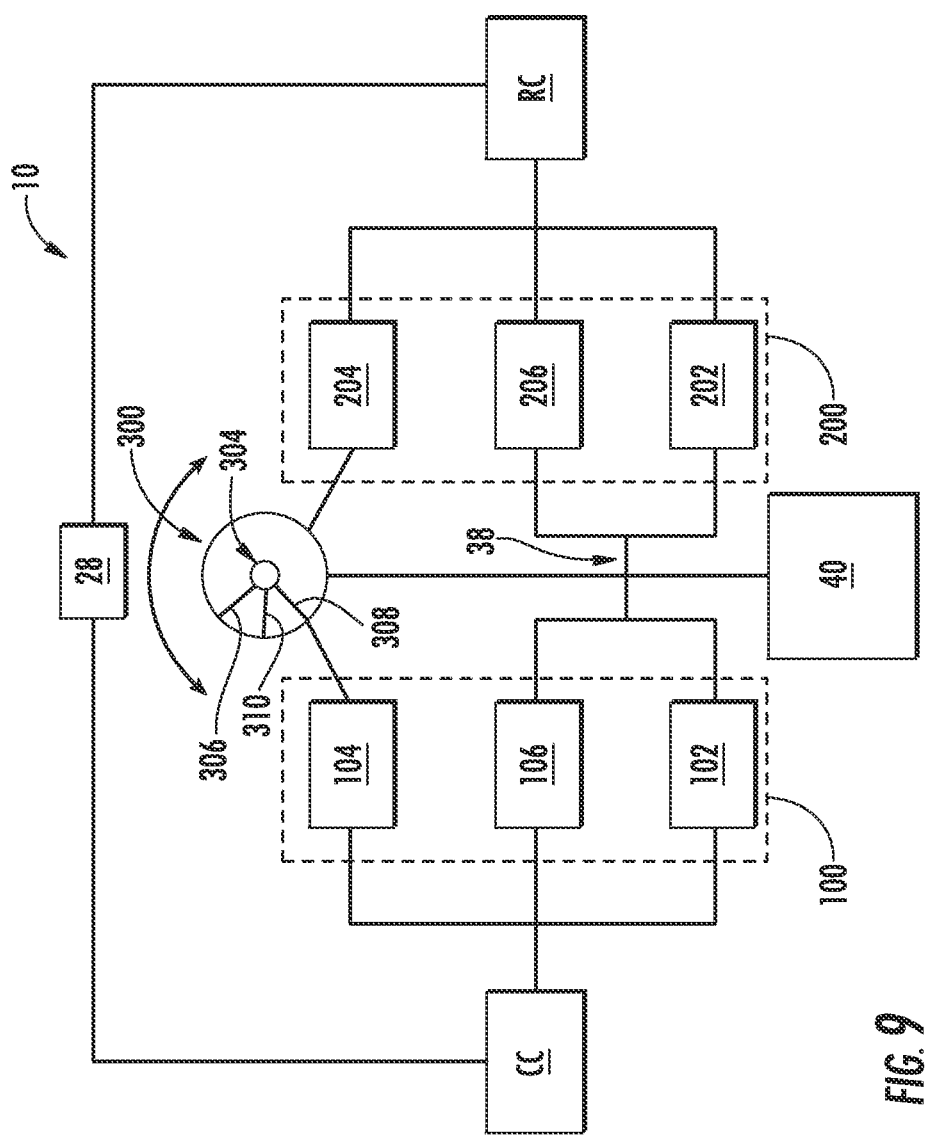
FIG. 9 provides a schematic of the damper as shown in FIG. 3, with the switchable flow valve set to a most restrictive flow setting according to one embodiment of the present invention.

FIG. 9 is a schematic of the damper 10 as shown in FIG. 3, with the switchable flow valve 300 set to a most restrictive or closed setting according to one embodiment of the present invention. As shown in FIG. 9, the switchable flow valve 300 may be rotated or otherwise actuated such that only one of the fluid ports 304 are aligned with one of the first bypass passage 104 or the second bypass passage 204 and the remaining fluid ports 304 are at least partially misaligned or completely misaligned so as to at least partially or fully block the remaining fluid ports 304 when the switchable flow valve 300 is switched to the most restrictive flow setting. This setting at least partially blocks or shuts off both the first bypass flow passage 104 and the second bypass flow passage 204 within the damper 10.

In one embodiment, as shown in FIG. 9, the second fluid port 308 is at least partially aligned with the first bypass flow passage 104. As shown in FIG. 9, the switchable flow valve 300 is rotated or otherwise actuated such that the second fluid port 308 is at least partially aligned and in fluid communication or fluidly linked with the first bypass flow passage 104 while the first fluid port 306 and the third fluid port 310 are misaligned or not in fluid communication with either the common flow passage 38 or the second bypass flow passage 204. This setting of the switchable flow valve 300 effectively blocks or shuts off the flow of the damping fluid 400 through both the first bypass flow passage 104 and the second bypass flow passage 204 within the damper 10.

Figure 10:
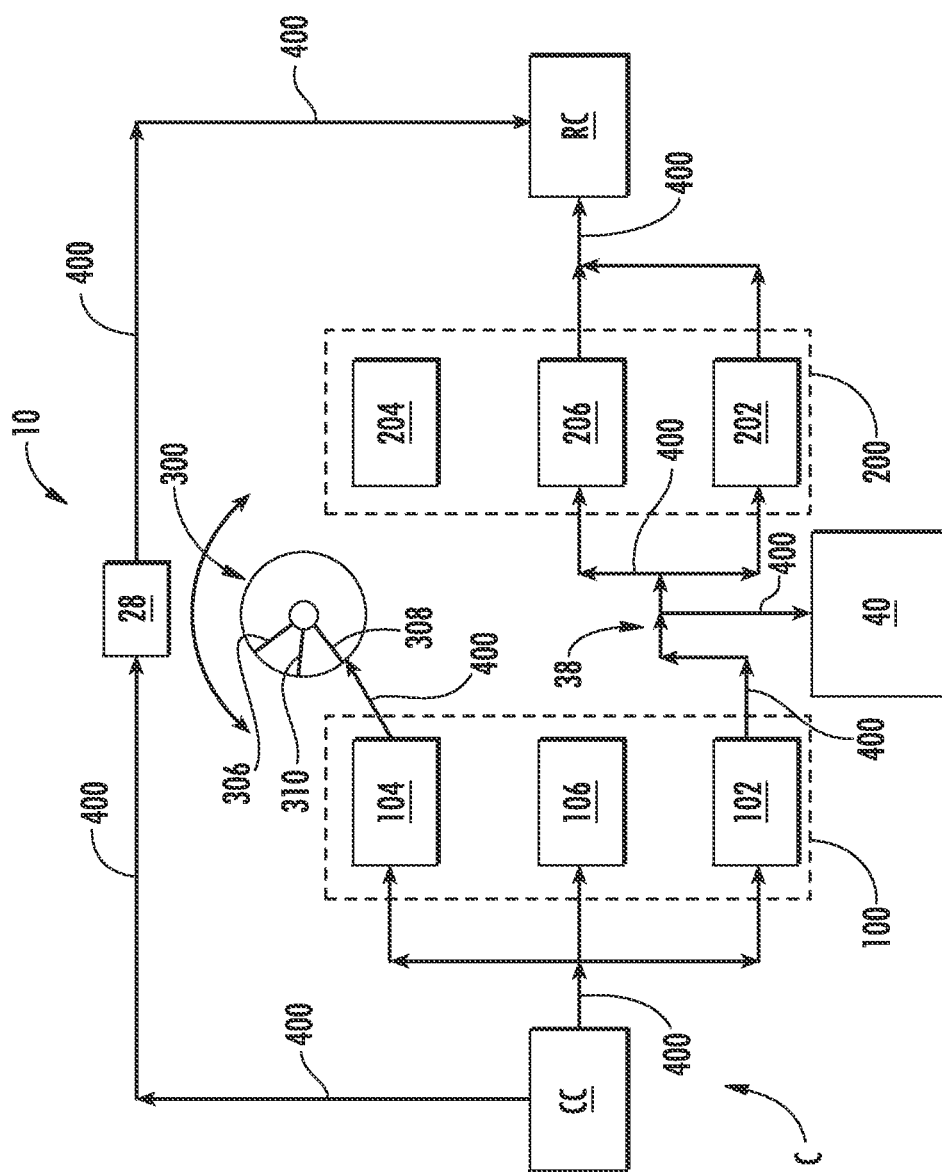
FIG. 10 provides a flow diagram of the damper as shown in FIG. 9, during a compression stroke.

FIG. 10 provides a flow diagram of the damper 10 as shown in FIG. 9, during the compression stroke C and according to one embodiment of the present invention. As shown in FIG. 10, a portion of the damping fluid 400 may flow from the compression chamber CC through the orifices 28 (FIG. 1) in the piston 26 (FIG. 1) towards the rebound chamber RC. A portion of the damping fluid 400 is directed from the compression chamber CC towards the first fluid circuit 100.

Although the first bypass flow passage 104 is fluidly linked to the switchable flow valve 300 via the second fluid port 308, the misalignment of the remaining fluid ports 306, 310 causes the damping fluid 400 to be directed or routed away from the first bypass flow passage 104. As a result, a portion of the damping fluid 400 is directed or routed through the primary flow passage 102 and into the common flow passage 38. A portion of the damping fluid 400 may then flow into the fluid reservoir 40 and/or may be routed towards the second fluid circuit 200. A portion of the damping fluid 400 may flow through the unidirectional flow passage 206 and/or through the primary flow passage 202 towards the rebound chamber RC.

Figure 11:
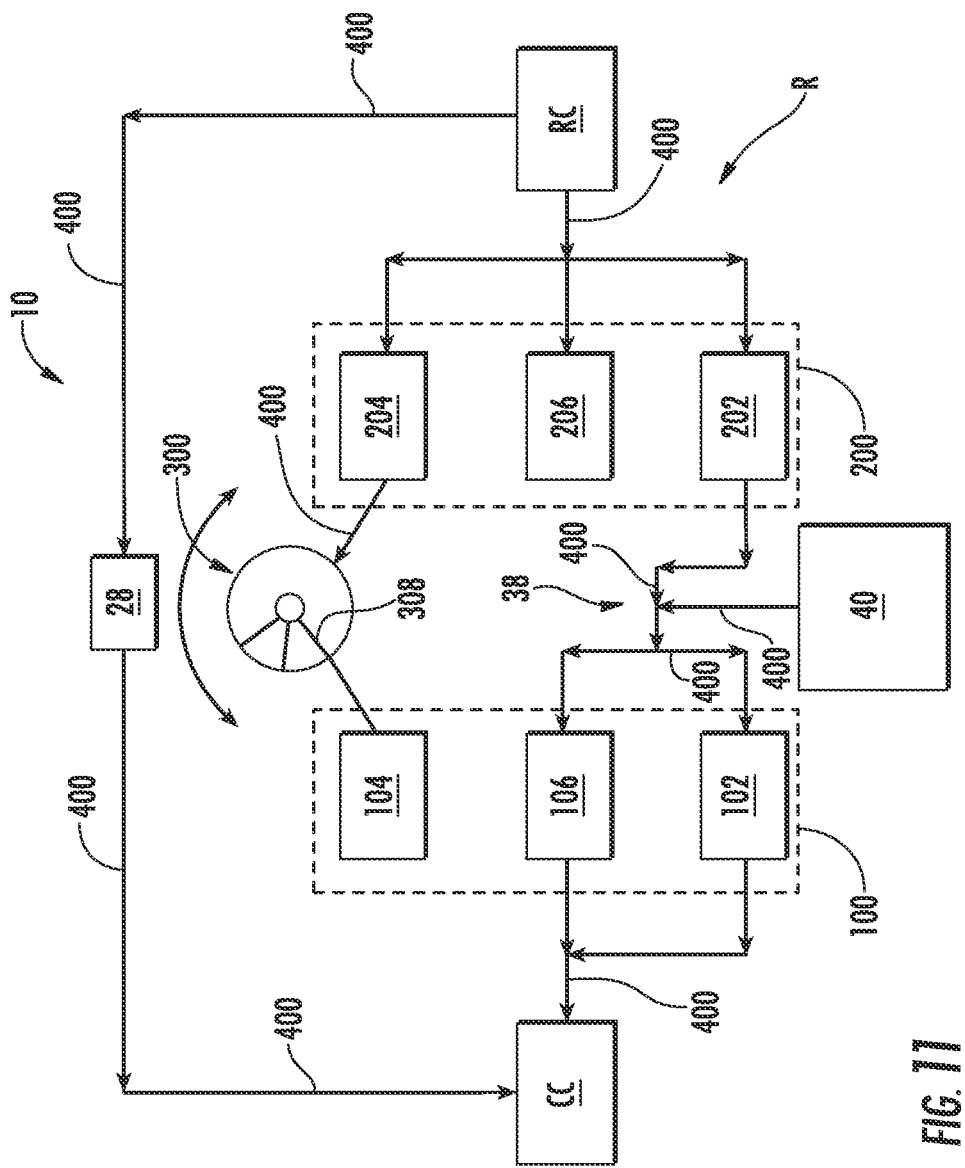
FIG. 11 provides a flow diagram of the damper as show in FIG. 9, during a rebound stroke.

FIG. 11 provides a flow diagram of the damper 10 as shown in FIG. 9, during the rebound stroke R. As shown in FIG. 11, a portion of the damping fluid 400 may flow from the rebound chamber RC through the orifices 28 (FIG. 1) in the piston 26 (FIG. 1) towards the compression chamber CC. Because the second bypass flow passage 204 is at least partially blocked by the switchable flow valve 300, the damping fluid 400 is directed or routed through the primary flow passage 202 into the common flow passage 38. A portion of the damping fluid 400 may then flow out of the fluid reservoir 40 and/or may be routed towards the first fluid circuit 100. A portion of the damping fluid 400 may flow through the unidirectional flow passage 106 and/or through the primary flow passage 102 towards the compression chamber CC.

Figure 12:
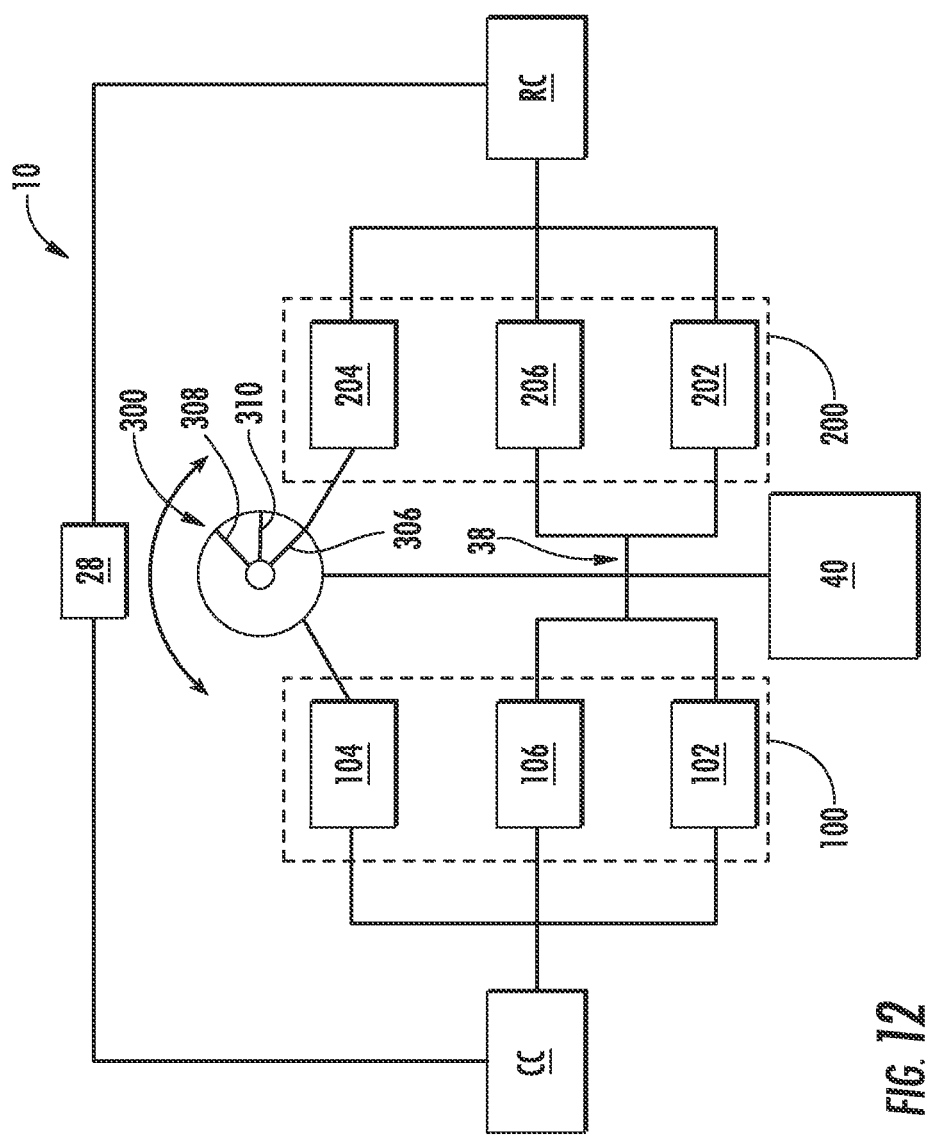
FIG. 12 provides a schematic of the damper as shown in FIG. 3, with the switchable flow valve set to a most restrictive flow setting according to one embodiment of the present invention.

FIG. 12 is a schematic of the damper 10 as shown in FIG. 3, with the switchable flow valve 300 set to a most restrictive flow or closed setting according to one embodiment of the present invention. As shown in FIG. 12, the switchable flow valve 300 may be rotated or otherwise actuated such that the first fluid port 306 is at least partially aligned and fluidly linked with the second bypass flow passage 204 while the second and third fluid ports 308, 310 are misaligned or not fluidly linked with either the common flow passage 38 or the first bypass flow passage 104. This effectively blocks or shuts off the flow of the damping fluid 400 through both the first bypass flow passage 104 and the second bypass flow passage 204 within the damper 10.

Figure 13:
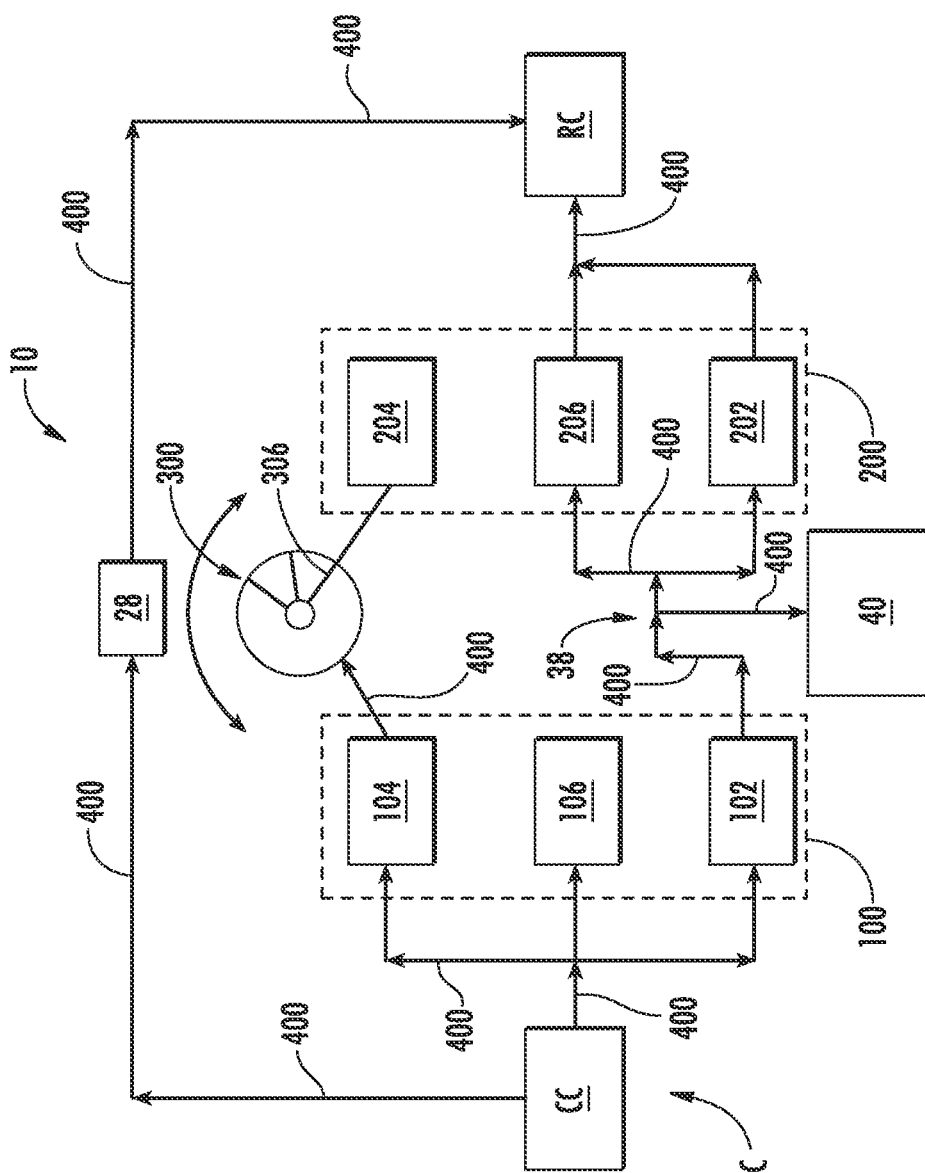
FIG. 13 provides a flow diagram of the damper as shown in FIG. 12, during a compression stroke.

FIG. 13 provides a flow diagram of the damper 10 as shown in FIG. 12, during the compression stroke C, according to one embodiment of the present invention. As shown in FIG. 13, a portion of the damping fluid 400 may flow from the compression chamber CC through the orifices 28 (FIG. 1) in the piston 26 (FIG. 1) towards the rebound chamber RC. Because the first bypass flow passage 104 is at least partially blocked by the switchable flow valve 300, the damping fluid 400 is directed or routed through the primary flow passage 102 into the common flow passage 38. A portion of the damping fluid 400 may then flow into the fluid reservoir 40 and/or may be routed towards the second fluid circuit 200. A portion of the damping fluid 400 may flow through the unidirectional flow passage 206 and/or through the primary flow passage 202 towards the rebound chamber RC.

Figure 14:
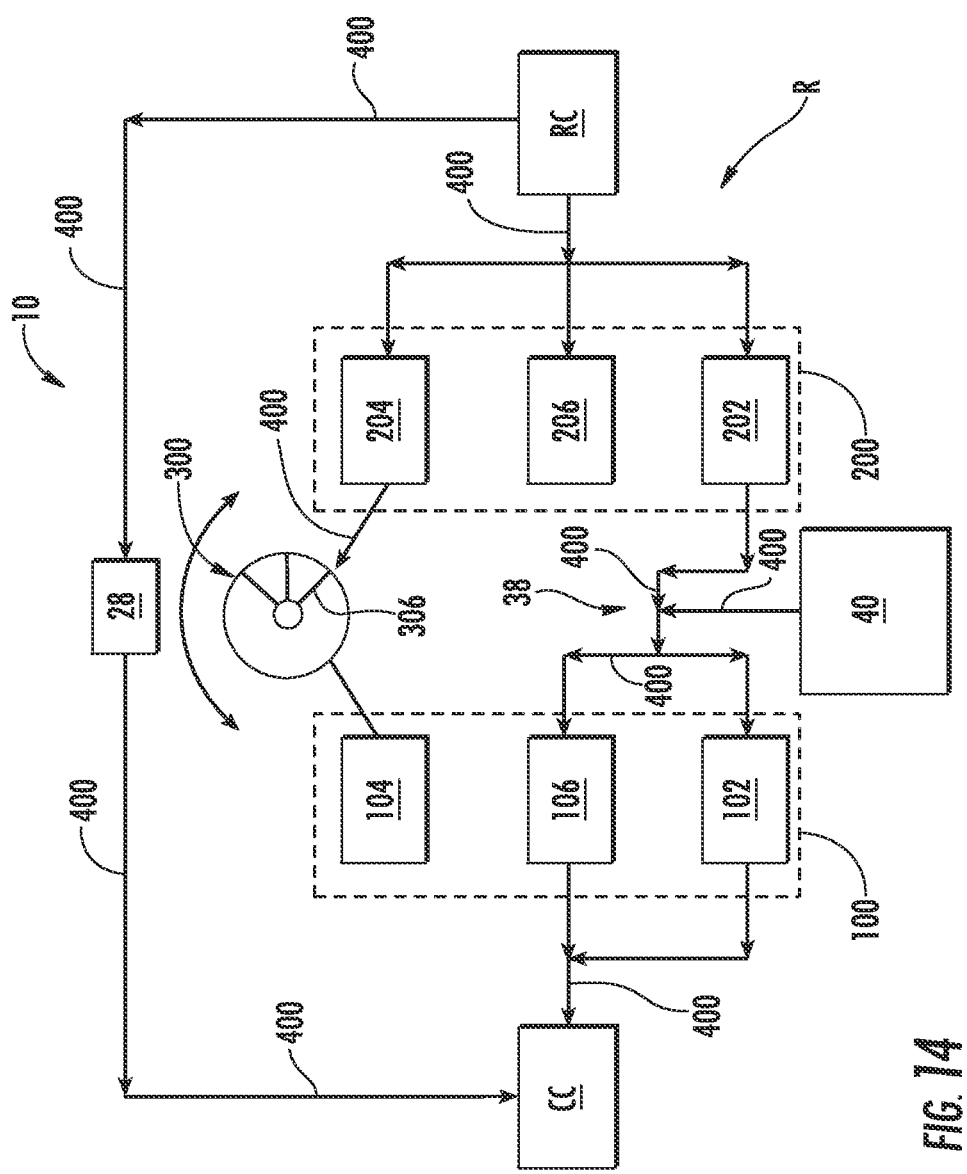
FIG. 14 provides a flow diagram of the damper as show in FIG. 12, during a rebound stroke.

FIG. 14 provides a flow diagram of the damper 10 as shown in FIG. 12, during the rebound stroke R. As shown in FIG. 14, a portion of the damping fluid 400 may flow from the rebound chamber RC through the orifices 28 in the piston 26 (FIG. 1) towards the compression chamber CC. A portion of the damping fluid 400 is directed from the rebound chamber RC towards the second fluid circuit 200. Although the second bypass flow passage 204 is fluidly linked to the switchable flow valve 300 via the first fluid port 306, the misalignment of the remaining fluid ports 308, 310 cause the damping fluid 400 to be directed or routed away from the second bypass flow passage 204. As a result, a portion of the damping fluid 400 is directed or routed through the primary flow passage 202 into the common flow passage 38. A portion of the damping fluid 400 may then flow out of the fluid reservoir 40 and/or may be routed towards the first fluid circuit 100. A portion of the damping fluid 400 may flow through the unidirectional flow passage 106 and/or through the primary flow passage 102 towards the compression chamber CC.

Figure 15:
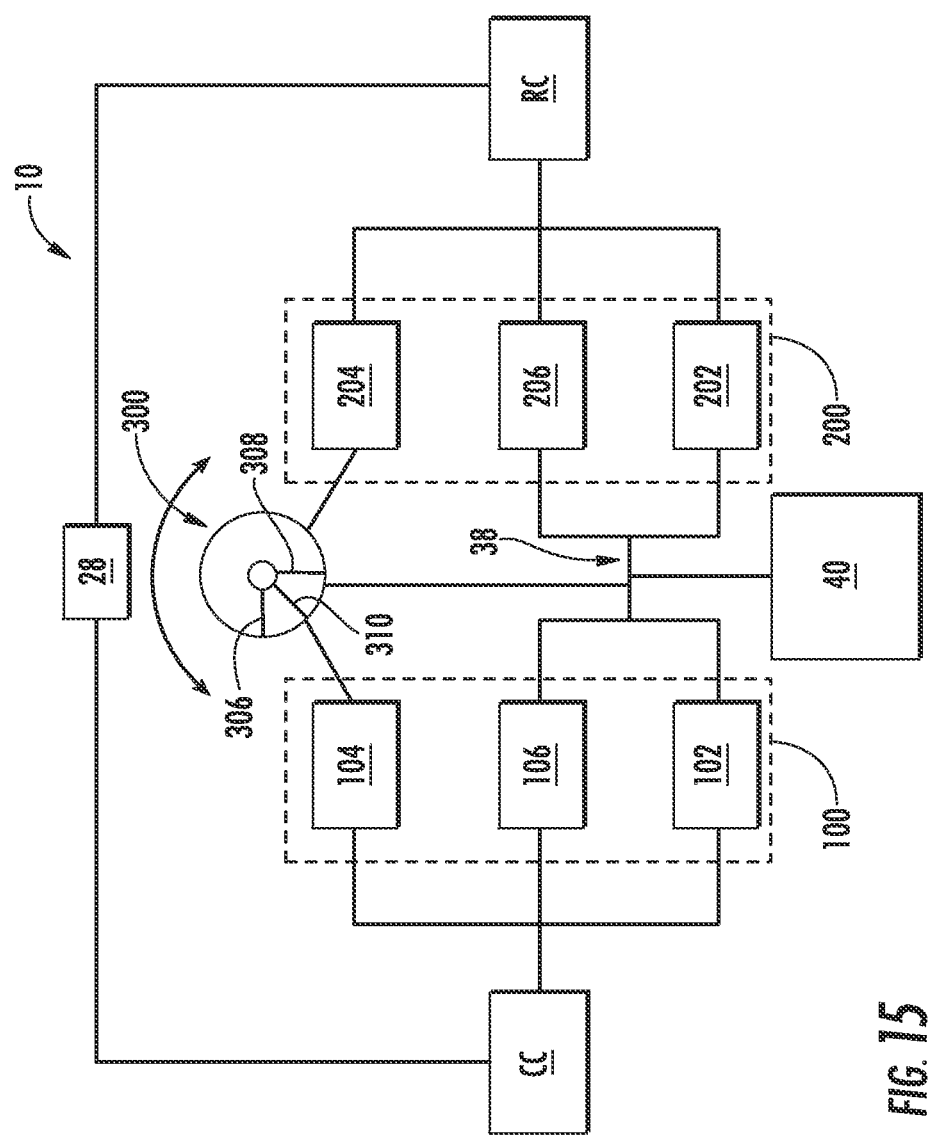
FIG. 15 provides a schematic of the damper as shown in FIG. 3, with the switchable flow valve set to a most restrictive flow setting according to one embodiment of the present invention.

FIG. 15 is a schematic of the damper 10 as shown in FIG. 3, with the switchable flow valve 300 set to a most restrictive or closed setting according to one embodiment of the present invention. As shown in FIG. 15, the switchable flow valve 300 may be rotated or otherwise actuated such that the third fluid port 310 is at least partially aligned and in fluid communication with the first bypass flow passage 104 while the first and second fluid ports 306, 308 are at least partially misaligned or not in fluid communication with either the common flow passage 38 or the second bypass flow passage 204. This effectively blocks or shuts off the flow of the damping fluid 400 through both the first bypass flow passage 104 and the second bypass flow passage 204 within the damper 10.

Figure 16:
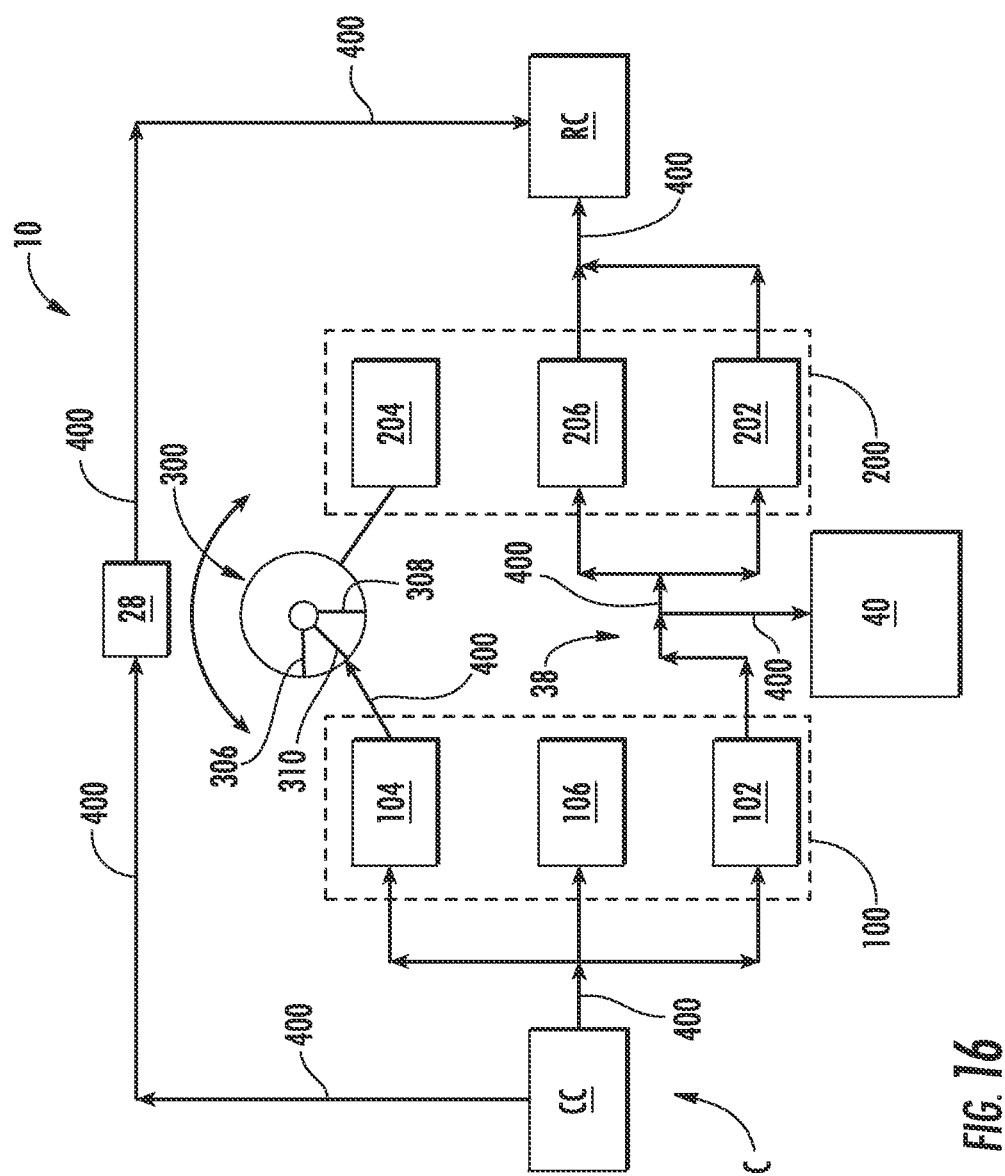
FIG. 16 provides a flow diagram of the damper as shown in FIG. 15, during a compression stroke.

FIG. 16 provides a flow diagram of the damper 10 as shown in FIG. 15, during the compression stroke C, according to one embodiment of the present invention. As shown in FIG. 16, a portion of the damping fluid 400 may flow from the compression chamber CC through the orifices 28 (FIG. 1) in the piston 26 (FIG. 1) towards the rebound chamber RC. A portion of the damping fluid 400 is directed from the compression chamber CC towards the first fluid circuit 100.

Although the first bypass flow passage 104 is fluidly linked to the switchable flow valve 300 via the third fluid port 310, the misalignment of the remaining fluid ports 306, 308 cause the damping fluid 400 to be directed or routed away from the first bypass flow passage 104. As a result, a portion of the damping fluid 400 is directed or routed through the primary flow passage 102 into the common flow passage 38. A portion of the damping fluid 400 may then flow into the fluid reservoir 40 and/or may be routed towards the second fluid circuit 200. A portion of the damping fluid 400 may flow through the unidirectional flow passage 206 and/or through the primary flow passage 202 towards the rebound chamber RC.

Figure 17:
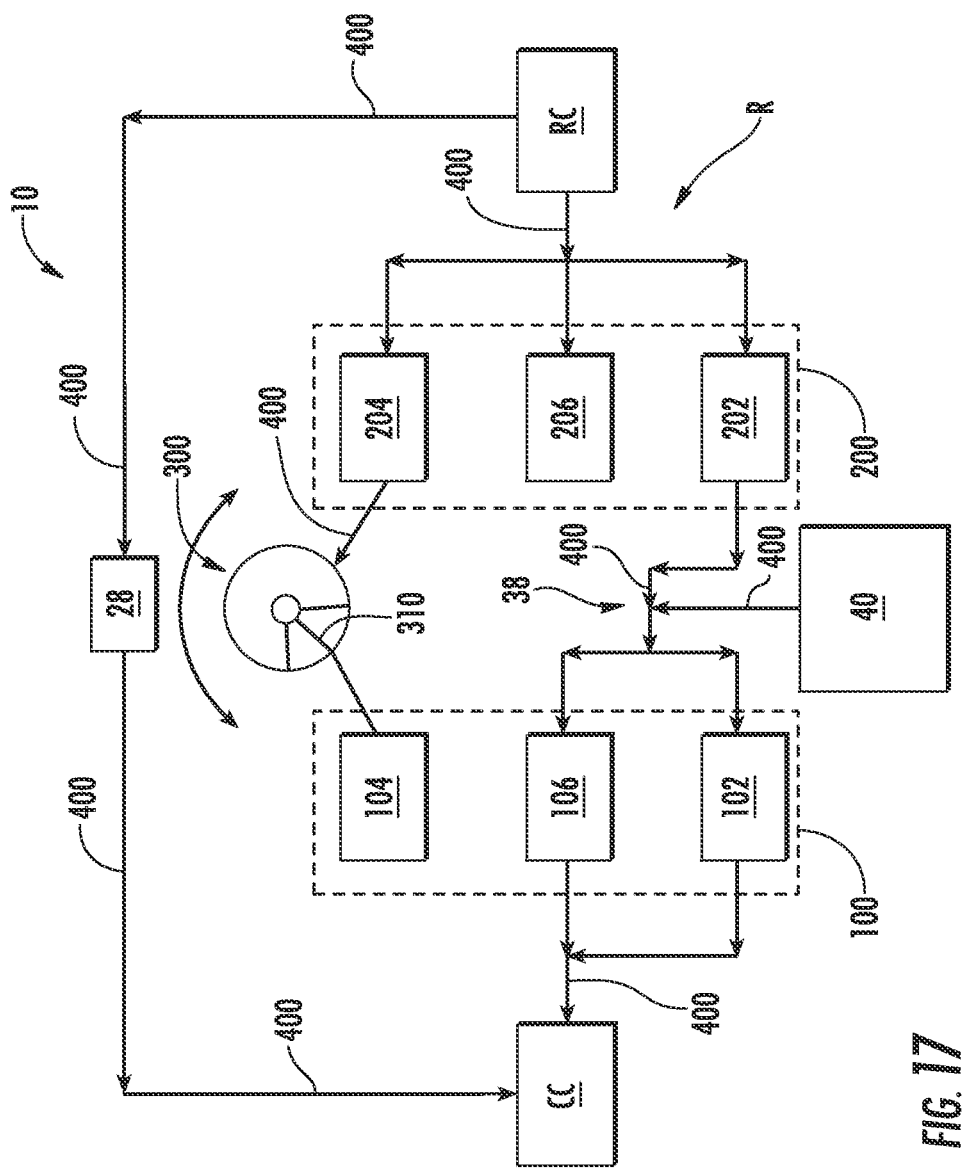
FIG. 17 provides a flow diagram of the damper as show in FIG. 15, during a rebound stroke.

FIG. 17 provides a flow diagram of the damper 10 as shown in FIG. 15, during the rebound stroke R. As shown in FIG. 17, a portion of the damping fluid 400 may flow from the rebound chamber RC through the orifices 28 (FIG. 1) in the piston 26 (FIG. 1) towards the compression chamber CC. Because the second bypass flow passage 204 is at least partially blocked by the switchable flow valve 300, the damping fluid 400 is directed or routed through the primary flow passage 202 into the common flow passage 38. A portion of the damping fluid 400 may then flow out of the fluid reservoir 40 and/or may be routed towards the first fluid circuit 100. A portion of the damping fluid 400 may flow through the unidirectional flow passage 106 and/or through the primary flow passage 102 towards the compression chamber CC.

Figure 18:
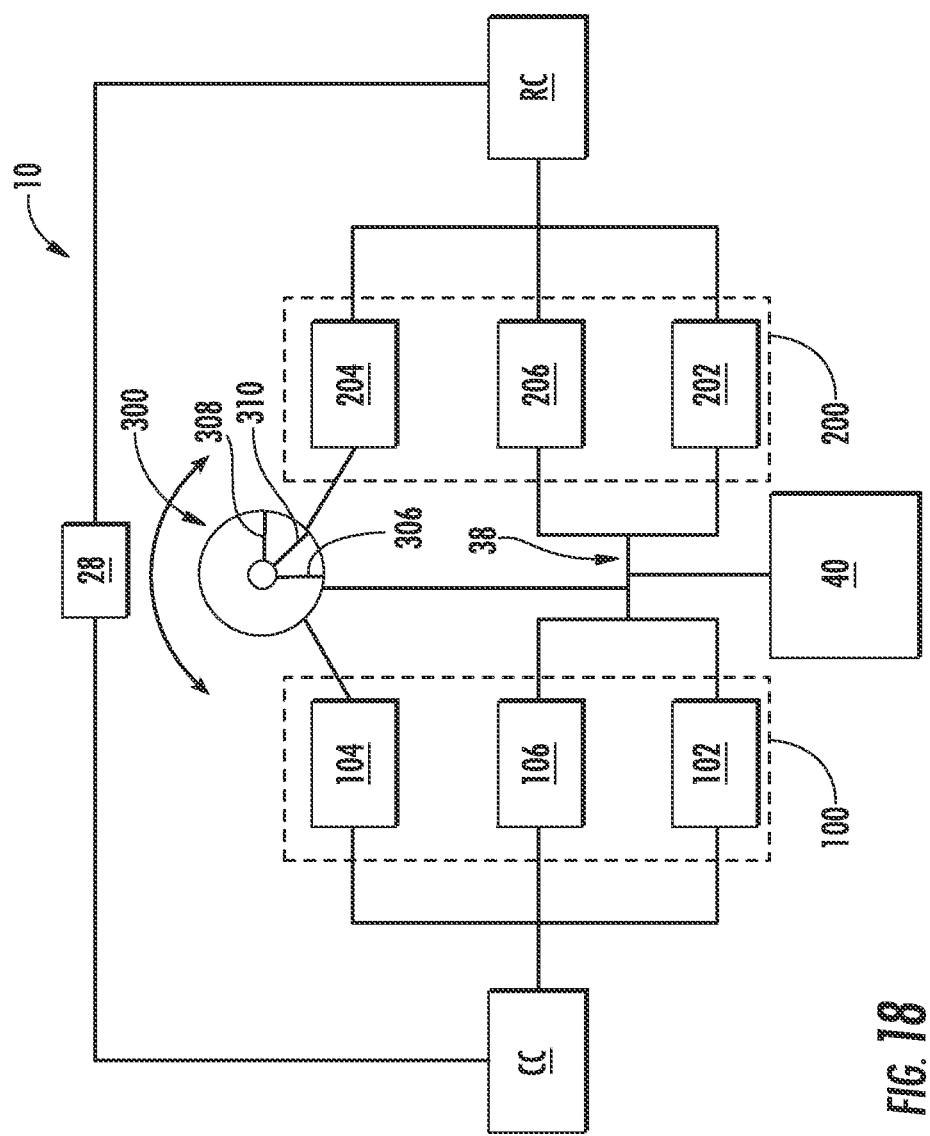
FIG. 18 provides a schematic of the damper as shown in FIG. 3, with the switchable flow valve set to a most restrictive flow setting according to one embodiment of the present invention.

FIG. 18 is a schematic of the damper 10 as shown in FIG. 3, with the switchable flow valve 300 set to a most restrictive or closed setting according to one embodiment of the present invention. As shown in FIG. 18, the switchable flow valve 300 may be rotated or otherwise actuated such that the third fluid port 310 is at least partially aligned and in fluid communication with the second bypass flow passage 204 while the first and second fluid ports 306, 308 are at least partially misaligned or not in fluid communication with either the common flow passage 38 or the first bypass flow passage 104. This at least partially blocks or shuts off the flow of the damping fluid 400 through both the first bypass flow passage 104 and the second bypass flow passage 204 within the damper 10.

Figure 19:
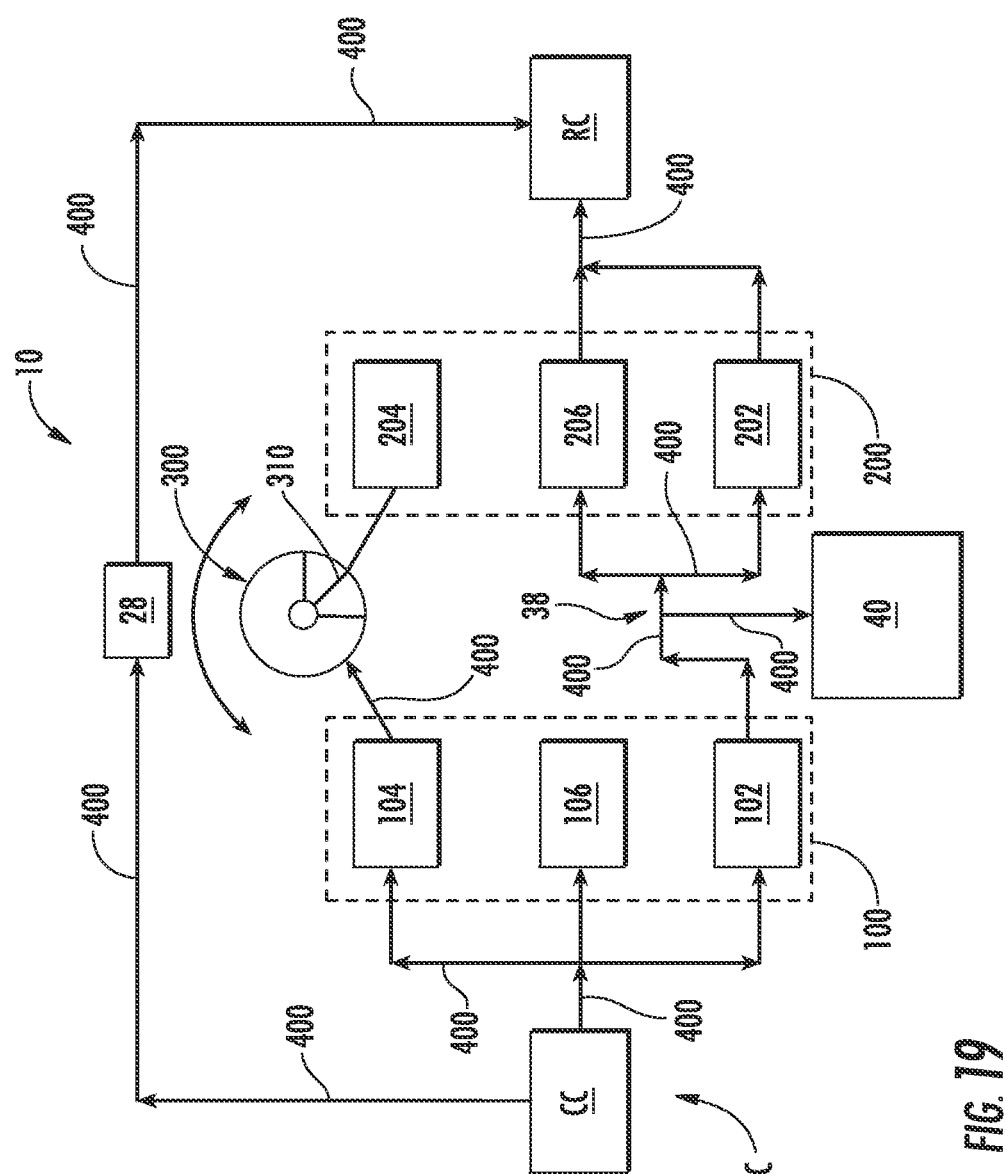
FIG. 19 provides a flow diagram of the damper as shown in FIG. 18, during a compression stroke.

FIG. 19 provides a flow diagram of the damper 10 as shown in FIG. 18, during the compression stroke C, according to one embodiment of the present invention. As shown in FIG. 19, a portion of the damping fluid 400 may flow from the compression chamber CC through the orifices 28 (FIG. 1) in the piston 26 (FIG. 1) towards the rebound chamber RC. Because the first bypass flow passage 104 is at least partially blocked by the switchable flow valve 300, the damping fluid 400 is directed or routed through the primary flow passage 102 into the common flow passage 38. A portion of the damping fluid 400 may then flow into the fluid reservoir 40 and/or may be routed towards the second fluid circuit 200. A portion of the damping fluid 400 may flow through the unidirectional flow passage 206 and/or through the primary flow passage 202 towards the rebound chamber RC.

Figure 20:
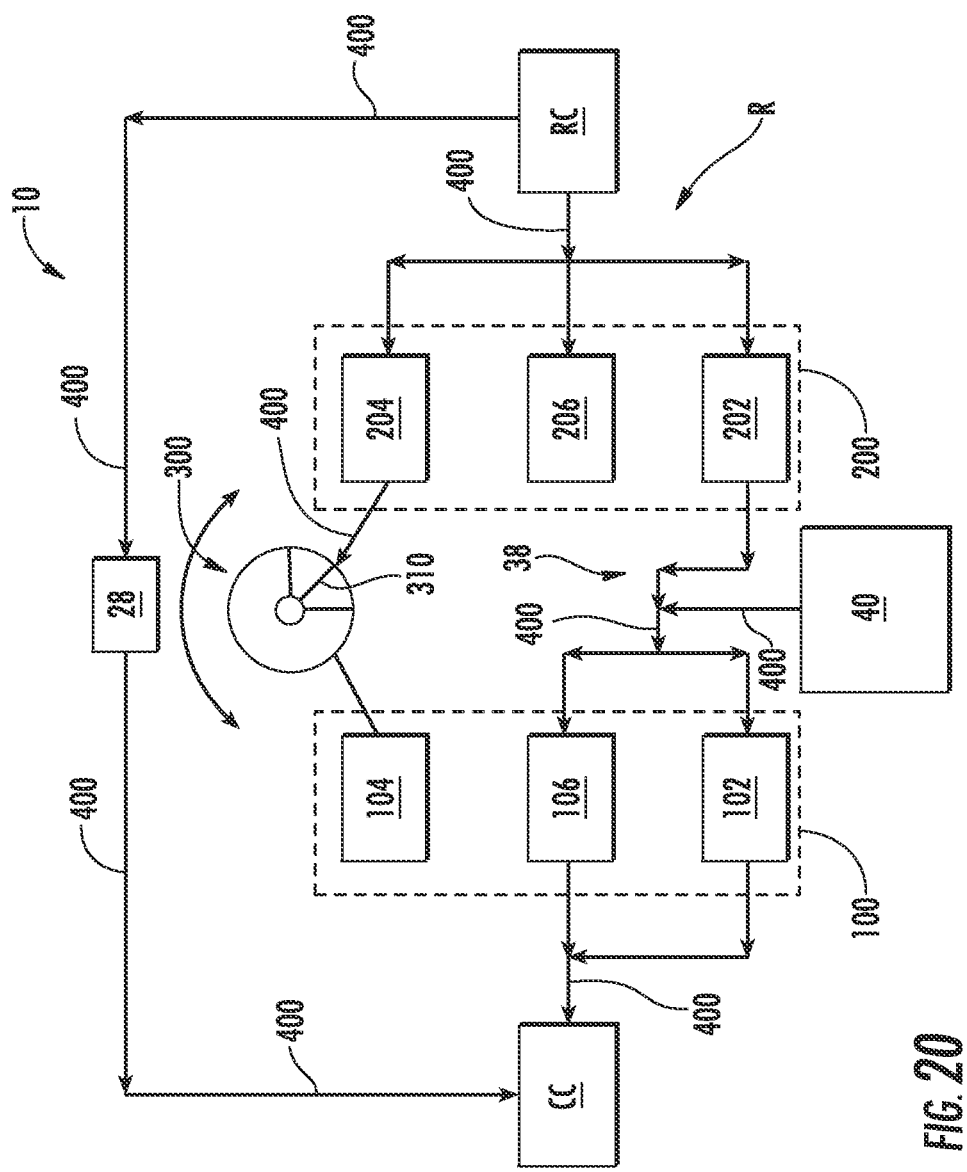
FIG. 20 provides a flow diagram of the damper as show in FIG. 18, during a rebound stroke.

FIG. 20 provides a flow diagram of the damper 10 as shown in FIG. 18, during the rebound stroke R. As shown in FIG. 20, a portion of the damping fluid 400 may flow from the rebound chamber RC through the orifices 28 (FIG. 1) in the piston 26 (FIG. 1) towards the compression chamber CC. A portion of the damping fluid 400 is directed from the rebound chamber RC towards the second fluid circuit 200. Although the second bypass flow passage 204 is fluidly linked to the switchable flow valve 300 via the third fluid port 310, the misalignment of the remaining fluid ports 306, 308 cause the damping fluid 400 to be directed or routed away from the second bypass flow passage 204. As a result, the damping fluid 400 is directed or routed through the primary flow passage 202 into the common flow passage 38. A portion of the damping fluid 400 may then flow out of the fluid reservoir 40 and/or may be routed towards the first fluid circuit 100. A portion of the damping fluid 400 may flow through the unidirectional flow passage 106 and/or through the primary flow passage 102 towards the compression chamber CC.

Figure 21:
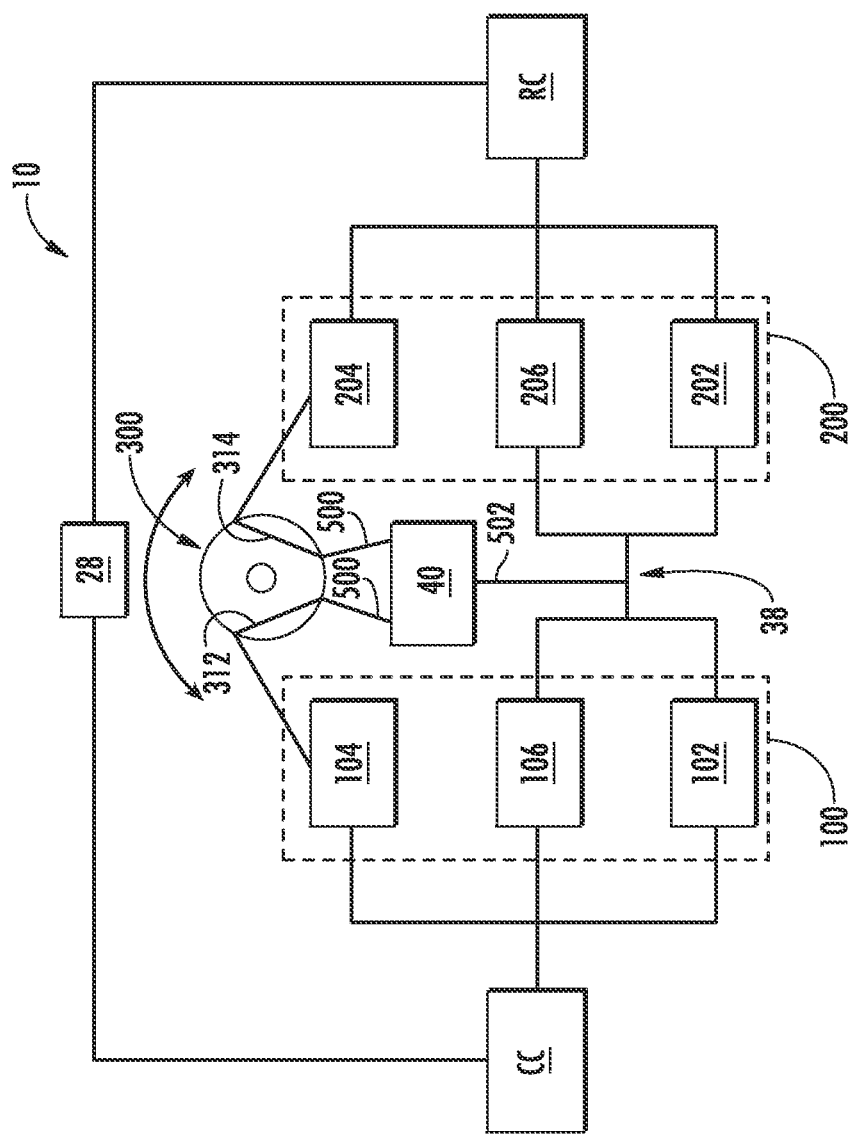
FIG. 21 provides a schematic of an exemplary damper including a switchable flow valve set to a least restrictive or maximum flow setting, according to one embodiment of the present invention.

FIG. 21 is a schematic of the damper 10 set to a least restrictive or maximum flow setting, according to one embodiment of the present invention. As shown in FIG. 21, the switchable flow valve 300 comprises a first fluid port 312 and a second fluid port 314. The first fluid port 312 is generally fluidly separated from the second fluid port 314. In one embodiment, the first fluid port 312 is in fluid communication with the first bypass flow passage 104 and the second fluid port 314 is in fluid communication with the second bypass flow passage 204.

In particular embodiments, each of the first and second flow paths 312, 314 are in fluid communication with the fluid reservoir 40. The fluid reservoir 40 is fluidly linked directly to each of the first fluid port 312 and the second fluid port 314. For example, the fluid reservoir 40 may be fluidly linked directly to each of the first fluid port 312 and the second fluid port 314 via a flow path or flow passage as may be defined by one or more tubes 500 or the like that extend therebetween. As a result, the first and second bypass flow passages 104, 204 are isolated from the common flow passage 38. In this manner, the fluid reservoir 40 may be positioned away from the main body of the damper 10. In this embodiment, as shown in FIG. 21, the fluid reservoir 40 is fluidly linked to the common flow passage 38 via a flow path 502 that is separate and distinct from the plurality of tubes 500.

Figure 22:
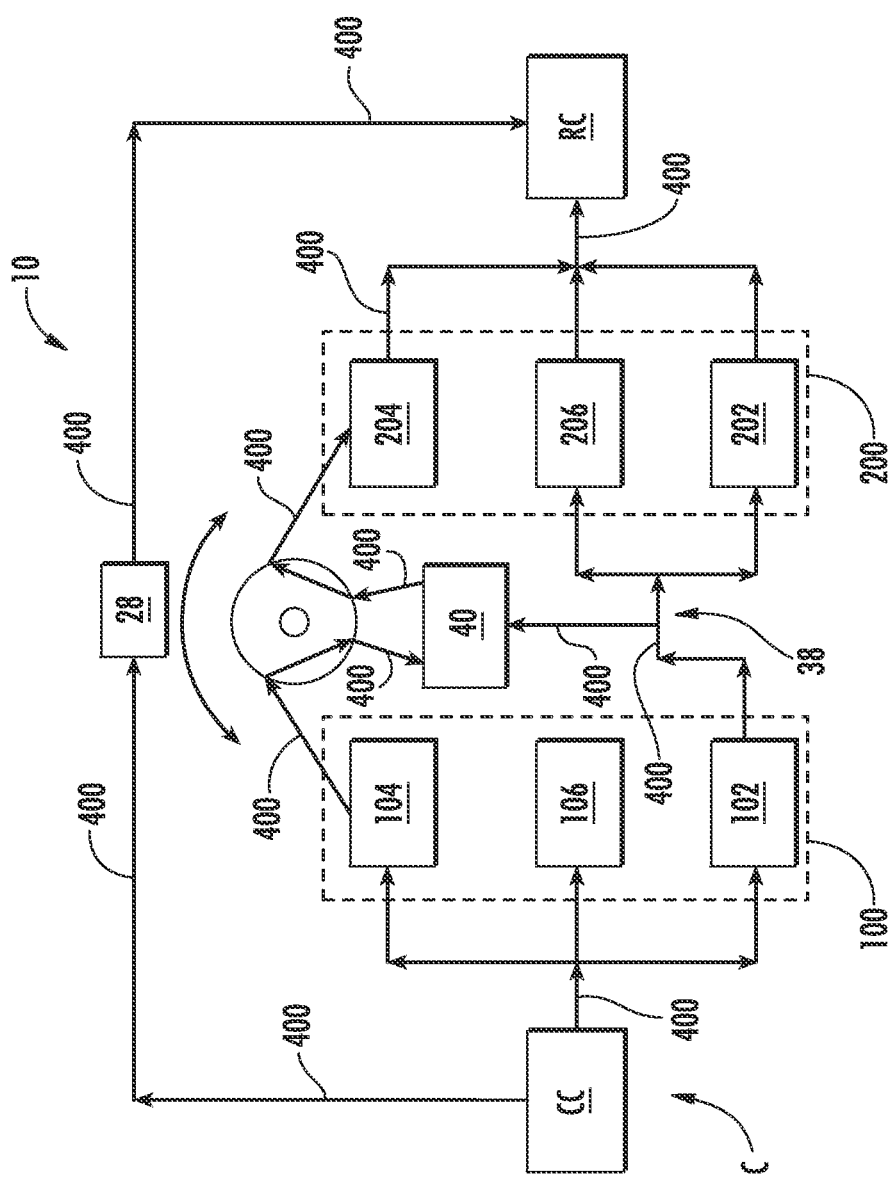
FIG. 22 provides a flow diagram of the damper as shown in FIG. 21, during a compression stroke.

FIG. 22 is a flow diagram of the damper 10 as shown in FIG. 21, during the compression stroke C with the switchable flow valve 300 set to a least restrictive or maximum fluid flow setting, according to one embodiment of the present invention. As shown in FIG. 22, a portion of the damping fluid 400 may flow from the compression chamber CC through the orifices 28 (FIG. 1) in the piston 26 (FIG. 1) towards the rebound chamber RC. A portion of the damping fluid 400 flows through the primary flow passage 102 and into the common flow passage 38. A portion of the damping fluid 400 may then flow towards the fluid reservoir 40 and/or may flow towards the second fluid circuit 200. A portion of the damping fluid 400 may then be routed through the unidirectional flow passage 206 and/or through the primary flow passage 202 of the second fluid circuit 200 and on towards the rebound chamber RC. A portion of the damping fluid 400 flows in parallel through the first bypass flow passage 104 and into the fluid reservoir 40 via the switchable flow valve 300, particularly via the first fluid port 312. A portion of the damping fluid 400 may then flow from the fluid reservoir 40 through the second port 314 of the switchable flow valve 300 towards the second bypass flow passage 204.

Figure 23:
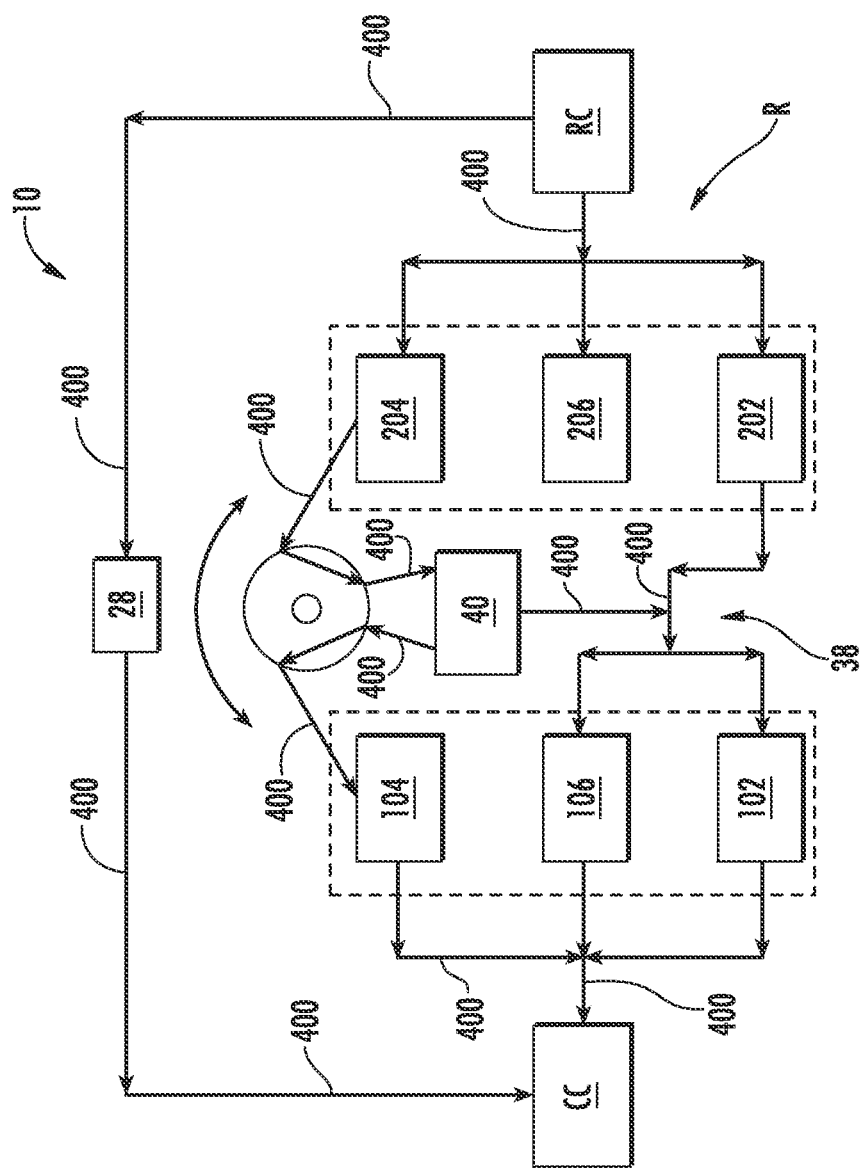
FIG. 23 provides a flow diagram of the damper as show in FIG. 21, during a rebound stroke.

FIG. 23 is a flow diagram of the damper 10 as show in FIG. 21 during the rebound stroke R, according to one embodiment of the present invention. As shown in FIG. 23, a portion of the damping fluid 400 may flow from the rebound chamber RC through the orifices 28 (FIG. 1) in the piston 26 (FIG. 1) towards the compression chamber CC. A portion of the damping fluid 400 flows through the primary flow passage 202 and into the common flow passage 38. A portion of the damping fluid 400 may then flow out of the fluid reservoir 40 and/or may flow towards the first fluid circuit 100. A portion of the damping fluid 400 may flow through the unidirectional flow passage 106 and/or through the primary flow passage 102 of the first fluid circuit 100 and on towards the compression chamber CC. A portion of the damping fluid 400 flows in parallel through the second bypass flow passage 204 and into the fluid reservoir 40 via the switchable flow valve 300, particularly via the second fluid port 314. A portion of the damping fluid 400 may then flow from the fluid reservoir 40 through the first fluid port 314 of the switchable flow valve 300 towards the first bypass flow passage 104.

Figure 24:
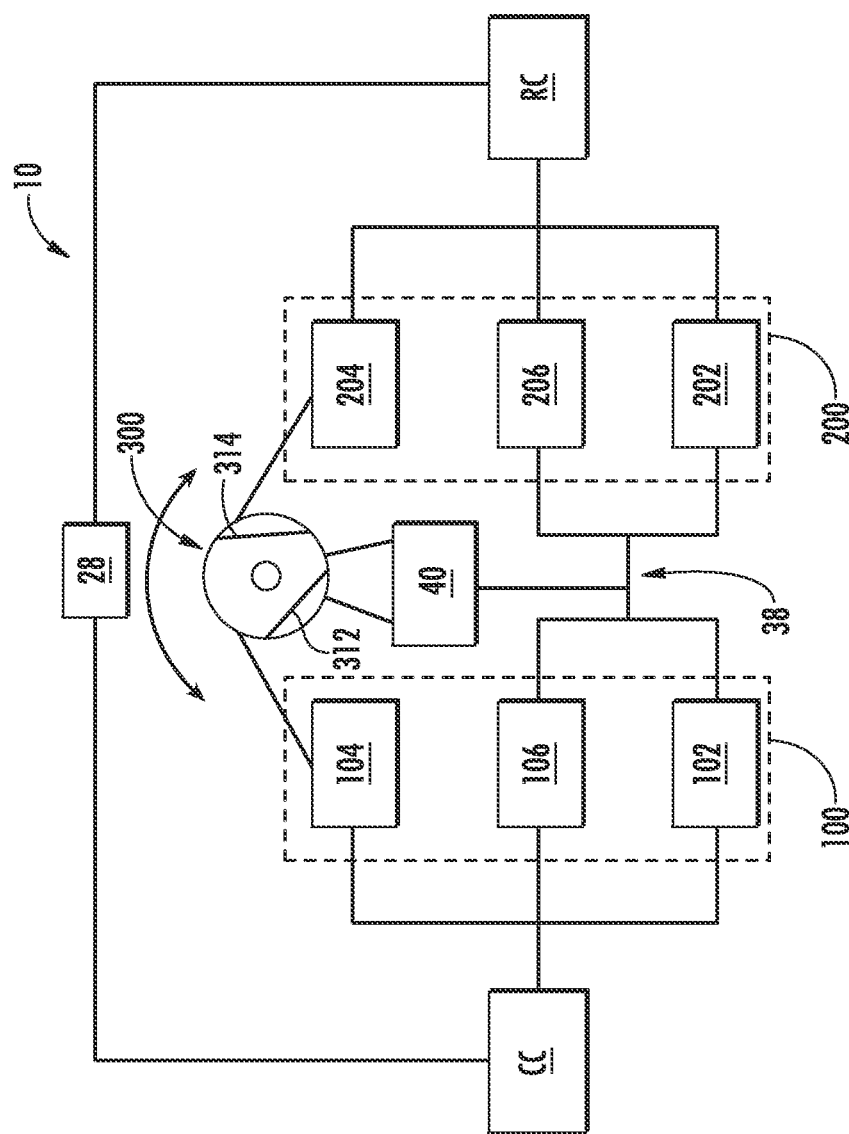
FIG. 24 provides a schematic of an exemplary damper including a switchable flow valve as shown in FIG. 21, with the switchable flow valve set to a most restrictive or no-flow flow setting, according to one embodiment of the present invention.

FIG. 24 is a schematic of the damper 10 as shown in FIG. 21, with the switchable flow valve 300 set to a most restrictive or no-flow setting according to one embodiment of the present invention. As shown in FIG. 24, the switchable flow valve 300 may be rotated or otherwise actuated such that each of the first fluid port 312 and the second fluid port 314 is at least partially or fully blocked. This setting effectively blocks or shuts off both the first bypass flow passage 104 and the second bypass flow passage 204 from the fluid reservoir 40.

Figure 25:
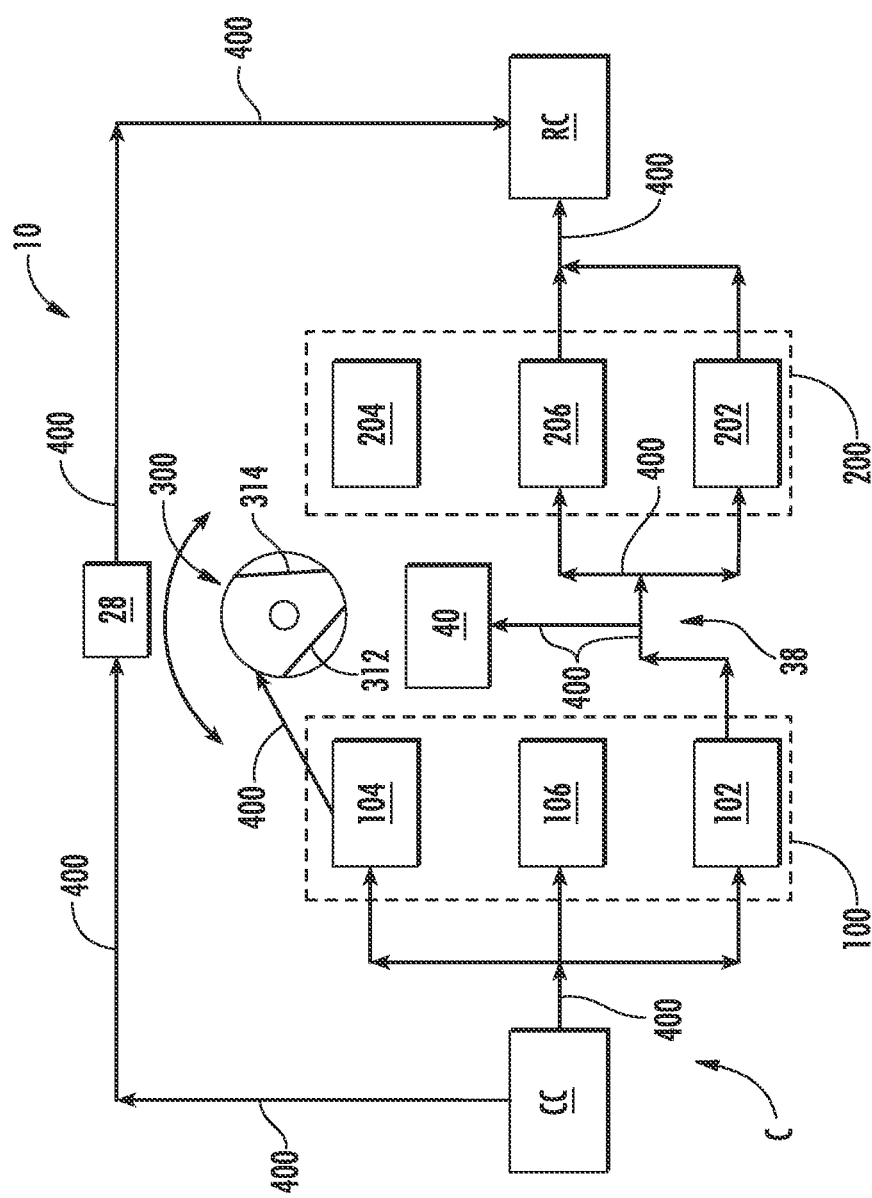
FIG. 25 provides a flow diagram of the damper as shown in FIG. 24, during a compression stroke.

FIG. 25 provides a flow diagram of the damper 10 as shown in FIG. 24 during the compression stroke C. As shown in FIG. 25, a portion of the damping fluid 400 may flow from the compression chamber CC through the orifices 28 (FIG. 1) in the piston 26 (FIG. 1) towards the rebound chamber RC. As shown in FIG. 25, a portion of the damping fluid 400 is directed from the compression chamber CC towards the first fluid circuit 100. The switchable flow valve 300 prevents or mostly restricts the damping fluid 400 from flowing through the first bypass passage 104. As a result, a portion of the damping fluid 400 is primarily directed through the primary flow passage 102 and into the common flow passage 38. The damping fluid 400 may flow into the fluid reservoir 40 and/or may be routed towards the second fluid circuit 200. The damping fluid 400 may be directed through the unidirectional flow passage 206 and/or through the primary flow passage 202 towards the rebound chamber RC.

Figure 26:
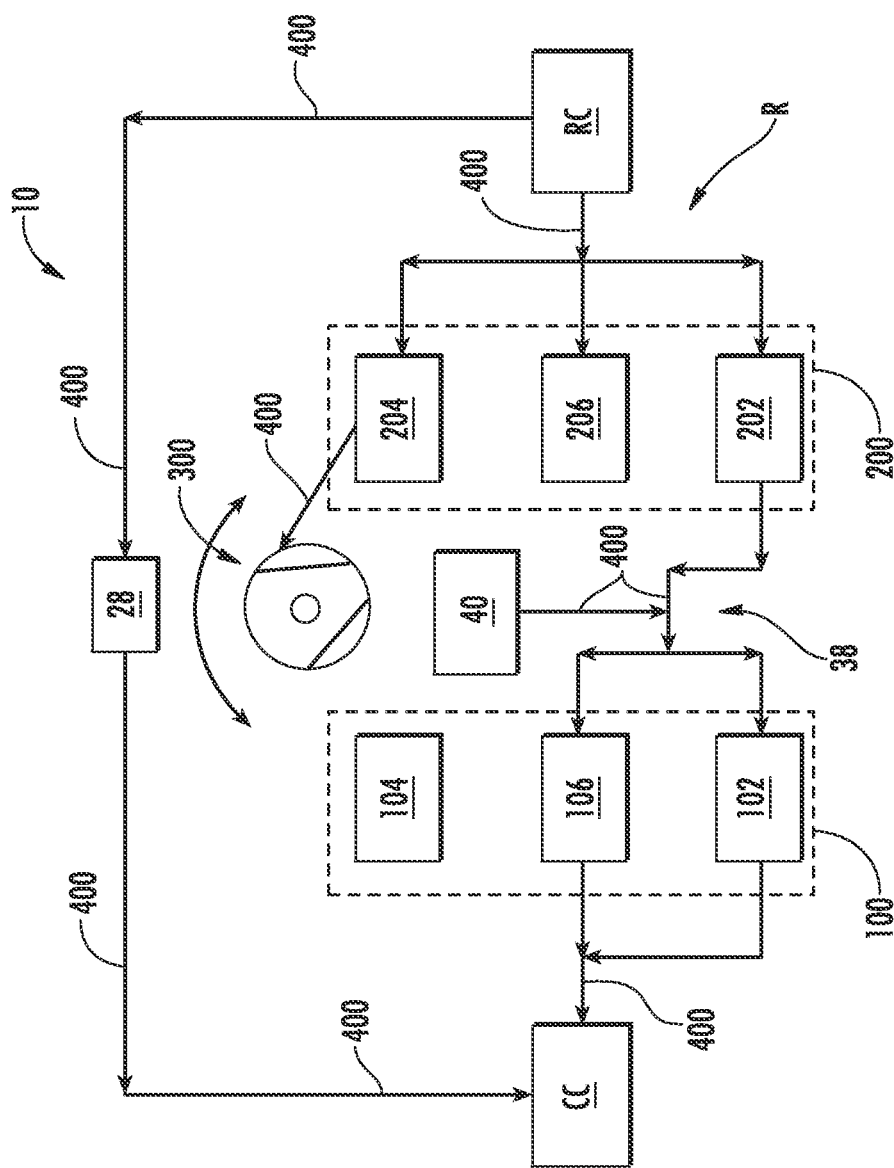
FIG. 26 provides a flow diagram of the damper as show in FIG. 24, during a rebound stroke.

FIG. 26 provides a flow diagram of the damper 10 as show in FIG. 24, during the rebound stroke R. As shown in FIG. 26, a portion of the damping fluid 400 may flow from the rebound chamber RC through the orifices 28 (FIG. 1) in the piston 26 (FIG. 1) towards the compression chamber CC. A portion of the damping fluid 400 is directed from the rebound chamber RC towards the second fluid circuit 200. The switchable flow valve 300 prevents or mostly restricts the damping fluid 400 from flowing through the second bypass passage 204. As a result, a portion of the damping fluid 400 is primarily directed through the primary flow passage 202 and into the common flow passage 38. A portion of the damping fluid 400 may flow out of the fluid reservoir 40 and/or may be routed towards the first fluid circuit 100. A portion of the damping fluid 400 may be directed through the unidirectional flow passage 106 and/or through the primary flow passage 102 towards the compression chamber CC.

Figure 27:
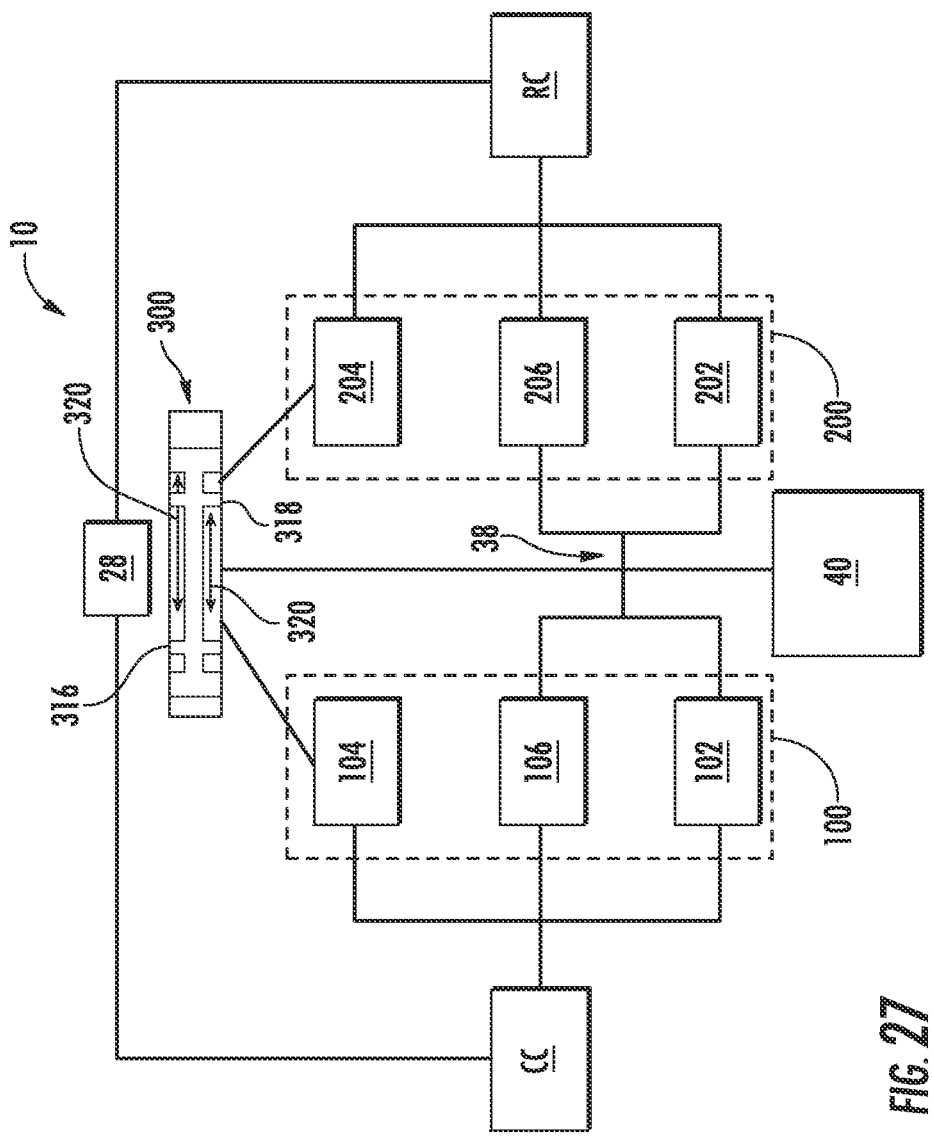
FIG. 27 provides a schematic of an exemplary damper including a switchable flow valve with the switchable flow valve set to a least restrictive or maximum flow setting, according to one embodiment of the present invention.

FIG. 27 is a schematic of the damper 10 set to a least restrictive or maximum flow setting, according to one embodiment of the present invention. In one embodiment, as shown in FIG. 27, the switchable flow valve 300 is linearly actuatable such as linearly actuated spool valve. In this embodiment, the switchable flow valve 300 defines a first landing 316, a second landing 318 and a spool flow passage 320. The switchable flow valve 300 may be linearly actuated by a cam (not shown), a lever (not shown), solenoid (not shown) or the like. Each of the first bypass flow passage 104 and the second bypass flow passage 204 are fluidly linked to the switchable flow valve 300, particularly the spool flow passage 320. The spool flow passage 320 may be fluidly linked to the fluid reservoir 40 via the common flow passage 38 and/or via a plurality of tubes 502. As shown in FIG. 27, the first bypass flow passage 104 and the second bypass flow passage 204 are fluidly linked and/or in fluid communication with the spool flow passage 320. The spool flow passage 320 is in fluid communication with the common flow passage 38.

Figure 28:
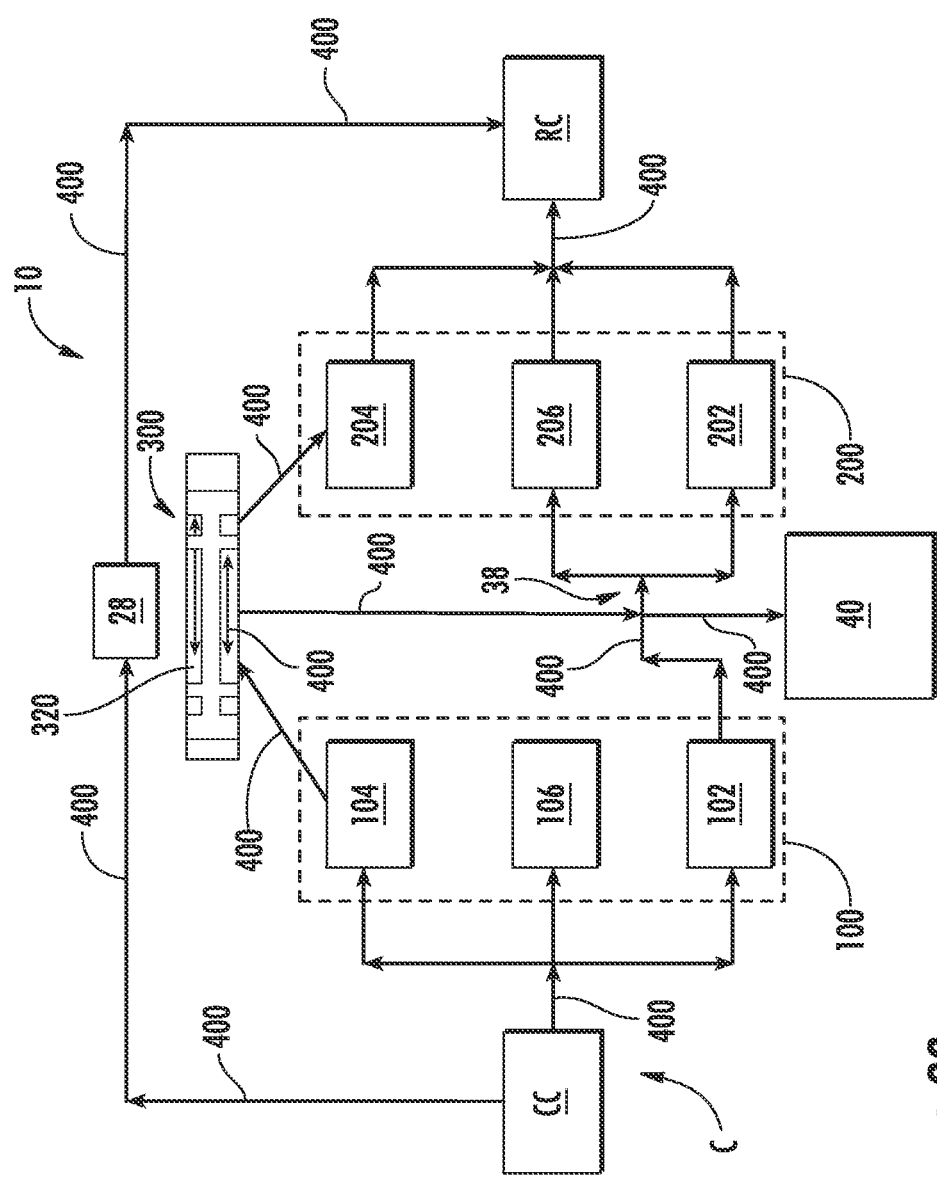
FIG. 28 provides a flow diagram of the damper as shown in FIG. 27, during a compression stroke.

FIG. 28 is a flow diagram of the damper 10 as show in FIG. 27 during the compression stroke C, according to one embodiment of the present invention. As shown in FIG. 28, a portion of the damping fluid 400 may flow from the compression chamber CC through the orifices 28 (FIG. 1) in the piston 26 (FIG. 1) towards the rebound chamber RC. A portion of the damping fluid 400 flows through the primary flow passage 102 and into the common flow passage 38. A portion of the damping fluid 400 may then flow towards the fluid reservoir 40 and/or may flow towards the second fluid circuit 200. A portion of the damping fluid 400 may then be routed through the unidirectional flow passage 206 and/or through the primary flow passage 202 of the second fluid circuit 200 and towards the rebound chamber RC.

A portion of the damping fluid 400 flows in parallel through the first bypass flow passage 104 and into the fluid reservoir 40 via the switchable flow valve 300, particularly via the spool flow passage 320. A portion of the damping fluid 400 may bleed away from the spool flow passage 320 via the second bypass flow passage 204 and flow towards the rebound chamber RC.

Figure 29:
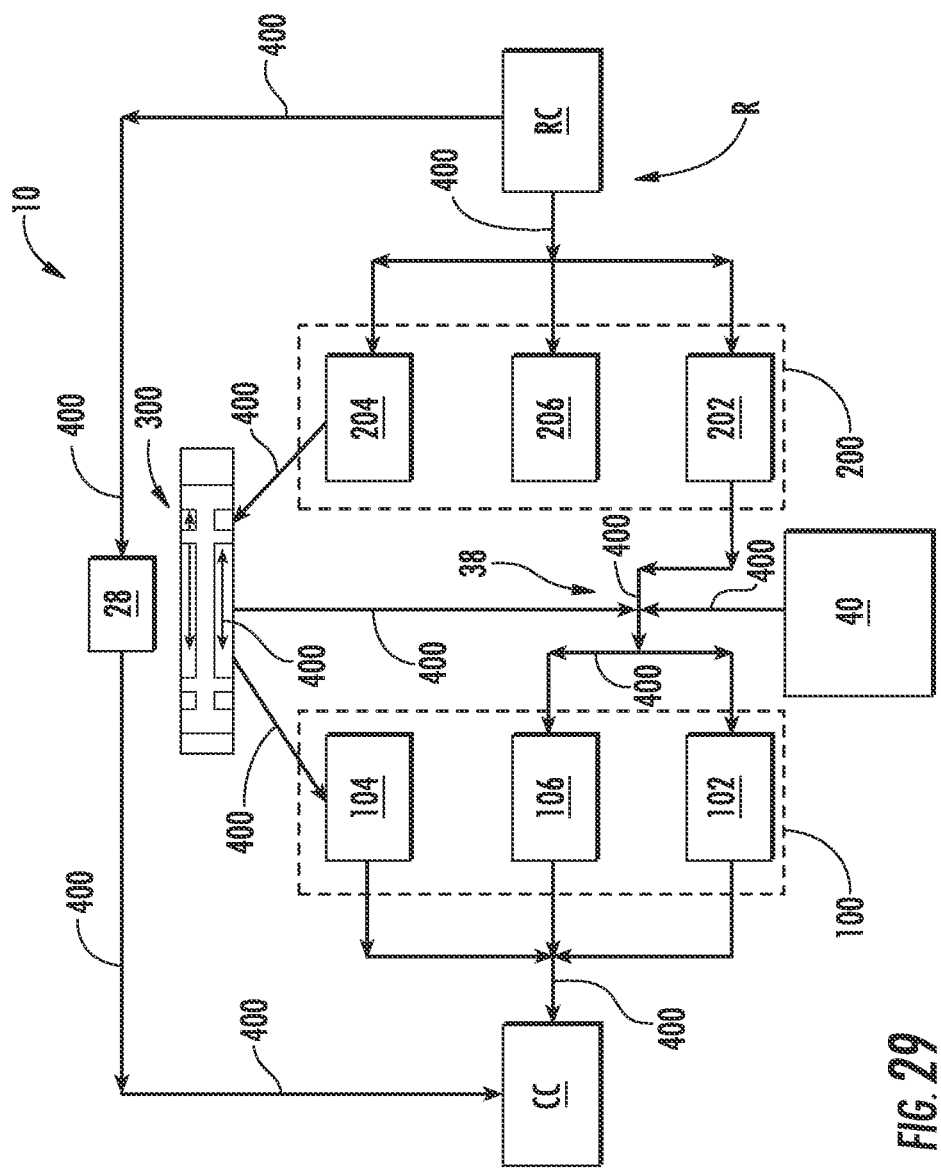
FIG. 29 provides a flow diagram of the damper as show in FIG. 27, during a rebound stroke.

FIG. 29 provides a flow diagram of the damper 10 as shown in FIG. 27, during the rebound stroke R. As shown in FIG. 29, a portion of the damping fluid 400 may flow from the rebound chamber RC through the orifices 28 (FIG. 1) in the piston 26 (FIG. 1) towards the compression chamber CC. A portion of the damping fluid 400 flows through the primary flow passage 202 and into the common flow passage 38. A portion of the damping fluid 400 may then flow towards the fluid reservoir 40 and/or may flow towards the first fluid circuit 100. A portion of the damping fluid 400 may then be routed through the unidirectional flow passage 106 and/or through the primary flow passage 102 of the first fluid circuit 100 and on towards the compression chamber CC. A portion of the damping fluid 400 flows in parallel through the second bypass flow passage 204 and out of the fluid reservoir 40 via the switchable flow valve 300, particularly via the spool flow passage 320. A portion of the damping fluid 400 may bleed away from the spool flow passage 320 via the first bypass flow passage 104 and flow towards the compression chamber CC.

Figure 30:
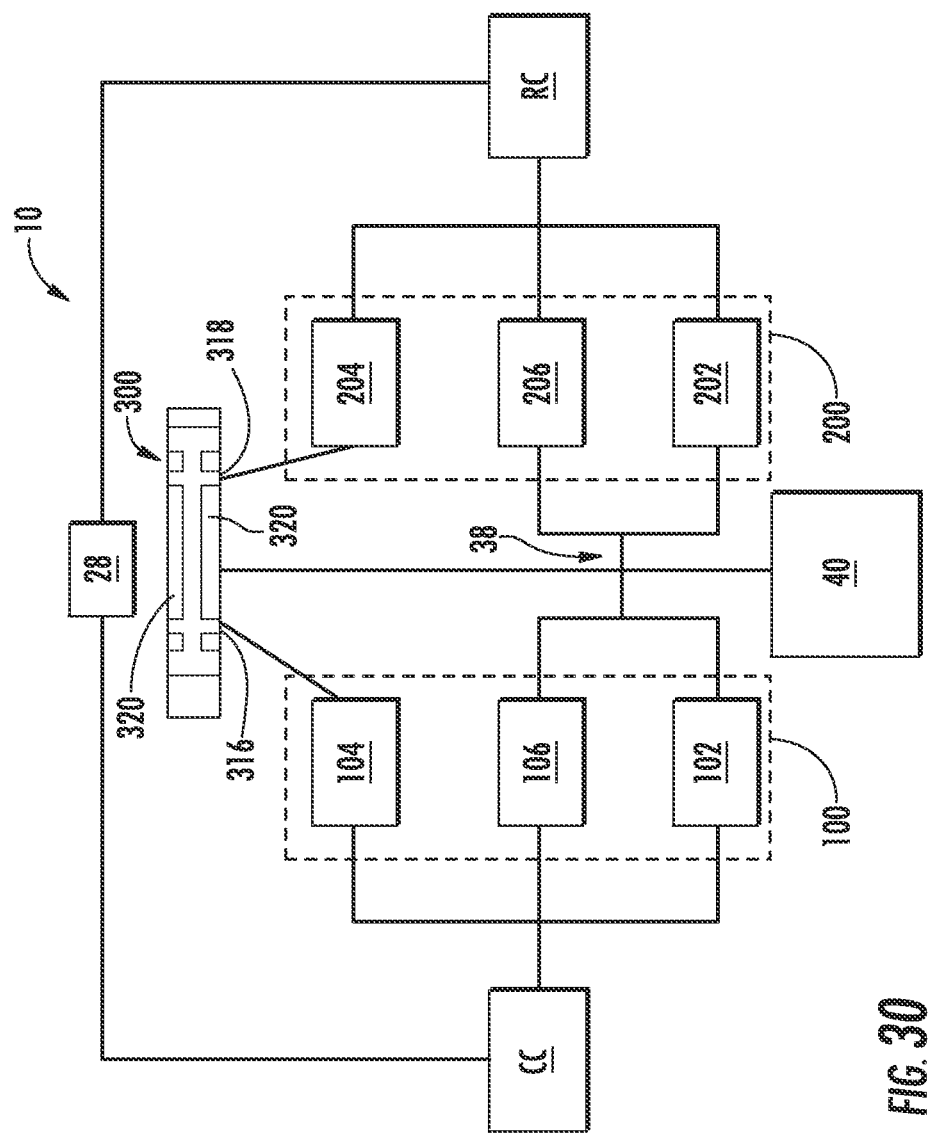
FIG. 30 provides a schematic of an exemplary damper including the switchable flow valve as shown in FIG. 27, with the switchable flow valve set to a most restrictive or no-flow flow setting, according to one embodiment of the present invention.

FIG. 30 is a schematic of the damper 10 as shown in FIG. 27 with the switchable flow valve 300 set to a most restrictive or no-flow setting, according to one embodiment of the present invention. As shown in FIG. 30, the switchable flow valve 300 may be linearly or otherwise actuated such that each of the first and second landings 316, 318 effectively block a portion of the damping fluid 400 from flowing from either of the first bypass flow passage 104 and/or the second bypass flow passage 204 towards the common flow passage 38 via the spool flow passage 320. This setting effectively blocks or shuts off both the first bypass flow passage 104 and the second bypass flow passage 204 from the common flow passage 38 and/or the fluid reservoir 40.

Figure 31:
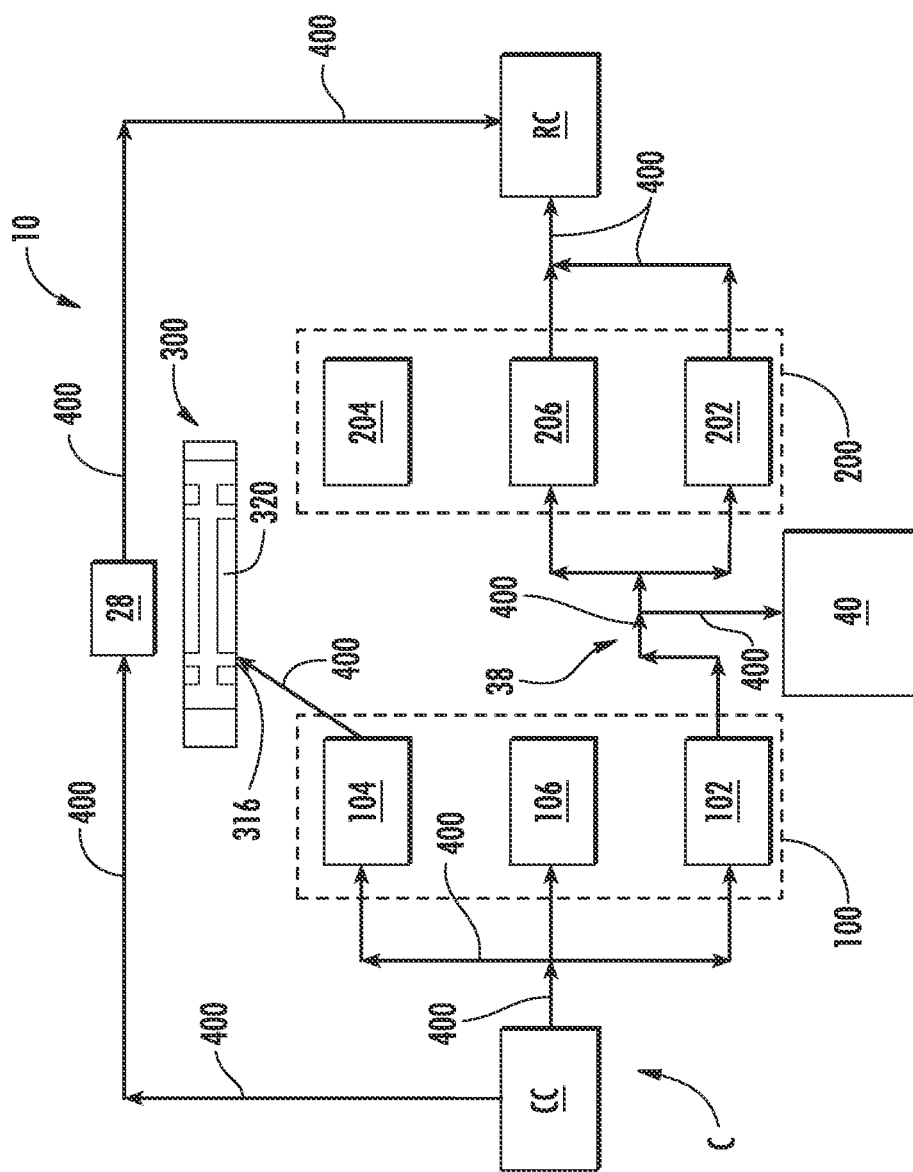
FIG. 31 provides a flow diagram of the damper as shown in FIG. 30, during a compression stroke.

FIG. 31 provides a flow diagram of the damper 10 as shown in FIG. 30 during the compression stroke C. As shown in FIG. 31, a portion of the damping fluid 400 may flow from the compression chamber CC through the orifices 28 (FIG. 1) in the piston 26 (FIG. 1) towards the rebound chamber RC. A portion of the damping fluid 400 is directed from the compression chamber CC towards the first fluid circuit 100. The switchable flow valve 300 prevents or mostly restricts the damping fluid 400 from flowing through the first bypass passage 104 and into the common flow passage 38 and/or the fluid reservoir 40 via the spool flow passage 320. As a result, a portion of the damping fluid 400 is primarily directed through the primary flow passage 102 and into the common flow passage 38. A portion of the damping fluid 400 may flow into the fluid reservoir 40 and/or may be routed towards the second fluid circuit 200. A portion of the damping fluid 400 may be directed through the unidirectional flow passage 206 and/or through the primary flow passage 202 towards the rebound chamber RC.

FIG. 32 provides a flow diagram of the damper 10 as show in FIG. 30, during the rebound stroke R. As shown in FIG. 32, a portion of the damping fluid 400 may flow from the rebound chamber RC through the orifices 28 (FIG. 1) in the piston 26 (FIG. 1) towards the compression chamber CC. The switchable flow valve 300 prevents or mostly restricts the damping fluid 400 from flowing through the second bypass passage 204 and into the common flow passage 38 and/or the fluid reservoir 40 via the spool flow passage 320. As a result, a portion of the damping fluid 400 is primarily directed through the primary flow passage 202 and into the common flow passage 38. A portion of the damping fluid 400 may flow out of the fluid reservoir 40 and/or may be routed towards the first fluid circuit 100. A portion of the damping fluid 400 may be directed through the unidirectional flow passage 106 and/or through the primary flow passage 102 towards the compression chamber CC.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A twin tube damper, comprising:
an inner fluid chamber;
an outer fluid chamber in fluid communication with said inner fluid chamber;
a first fluid circuit in fluid communication with said inner fluid chamber, said first fluid circuit comprising a first primary flow passage and a first bypass flow passage;
a second fluid circuit in fluid communication with said outer fluid chamber and in fluid communication with said first fluid circuit, said second fluid circuit comprising a second primary flow passage and a second bypass flow passage;
a common flow passage disposed and in fluid communication between the first fluid circuit and the second fluid circuit, wherein the first primary flow passage and the first bypass flow passage are disposed and provide fluid communication between the first fluid circuit and the common flow passage, and wherein the second primary flow passage and the second bypass flow passage are disposed and provide fluid communication between the second fluid circuit and the common flow passage; and a switchable flow valve for directing fluid flow between said first bypass flow passage and at least one of said common flow passage and said second bypass flow passage, and between said second bypass flow passage and at least one of said common flow passage and first bypass flow control passage.

2. The twin tube damper as in claim 1, further comprising a piston, said piston being disposed within said inner fluid chamber to move a damping fluid between said inner and outer fluid chambers via said first and second fluid circuits.

3. The twin tube damper as in claim 1, further comprising an externally actuated mechanism coupled to said switchable flow valve, wherein said externally actuated mechanism is manually, mechanically, hydraulically, pneumatically, or electrically actuatable.

4. The twin tube damper as in claim 1, further comprising a fluid reservoir, wherein said fluid reservoir is fluidly linked with said switchable flow valve via at least one of said common flow passage, said first bypass flow passage or said second bypass flow passage.

5. The twin tube damper as in claim 1, wherein said switchable flow valve comprises a rotatable spool valve, said rotatable spool valve defining a first fluid port, a second fluid port and a third fluid port, said third fluid port being in fluid communication with each of said first and second fluid ports.

6. The twin tube damper as in claim 5, wherein said first fluid port is in fluid communication with said first bypass flow passage, said second fluid port is in fluid communication with said second bypass flow passage and said third fluid port is in fluid communication with said common flow passage when said switchable flow valve is switched to a least restrictive flow setting.

7. The twin tube damper as in claim 5, wherein at least two of said first fluid port, said second fluid port and said third fluid port are at least partially blocked when said switchable flow valve is switched to a most restrictive flow setting.

8. The twin tube damper as in claim 5, wherein one of the first fluid port or the third fluid port is in fluid communication with said second bypass flow passage when said switchable flow valve is switched to a most restrictive flow setting.

9. The twin tube damper as in claim 5, wherein one of the second fluid port or the third fluid port is in fluid communication with said first bypass flow passage when said switchable flow valve is switched to a most restrictive flow setting.

10. The twin tube damper as in claim 1, wherein said switchable flow valve comprises a rotatable spool valve, said rotatable spool valve defining a first fluid port and a second fluid port, wherein said first fluid port is in fluid communication with said first bypass flow passage and with common flow passage, and said second fluid port is in fluid communication with said second bypass flow passage and said common flow passage when said switchable flow valve is switched to a least restrictive flow setting.

11. The twin tube damper as in claim 10, wherein said first fluid port and said second fluid port are at least partially blocked when said switchable flow valve is switched to a most restrictive flow setting.

12. The twin tube damper as in claim 1, wherein said switchable flow valve comprises a linearly actuated spool valve, said linearly actuated spool valve defining a first landing, a second landing and a spool flow passage.

13. The twin tube damper as in claim 12, wherein said first landing at least partially blocks said first bypass flow passage and said second landing at least partially blocks said second bypass flow passage when said switchable flow control valve is switched to a most restrictive flow setting.

14. The twin tube damper as in claim 12, wherein said first bypass flow passage and said second bypass flow passage are in fluid communication with said spool flow passage, said spool flow passage being in fluid communication with said common flow passage when said switchable flow control valve is switched to a least restrictive flow setting.

15. The twin tube damper as in claim 12, wherein said first fluid port and said second fluid port are blocked when said switchable flow valve is switched to a most restrictive flow setting.

16. A twin tube damper, comprising:
an inner fluid chamber;
an outer fluid chamber in fluid communication with said inner fluid chamber;
a first fluid circuit in fluid communication with said inner fluid chamber, said first fluid circuit comprising a first primary flow passage and a first bypass flow passage;
a second fluid circuit in fluid communication with said outer fluid chamber and in fluid communication with said first fluid circuit, said second fluid circuit comprising a second primary flow passage and a second bypass flow passage;
a common flow passage disposed and in fluid communication between the first fluid circuit and the second fluid circuit, wherein the first primary flow passage and the first bypass flow passage are disposed and provide fluid communication between the first fluid circuit and the common flow passage, and wherein the second primary flow passage and the second bypass flow passage are disposed and provide fluid communication between the second fluid circuit and the common flow passage;
a fluid reservoir in fluid communication with said common flow passage;
a piston that travels within said inner fluid chamber;
a switchable flow valve fluidly linked to said fluid reservoir; and
wherein said switchable flow valve directs fluid flow between said fluid reservoir and at least one of said first bypass flow passage or said second bypass flow passage.

17. The twin tube damper as in claim 16, further comprising an external actuating mechanism coupled to said switchable flow valve, wherein said external actuating mechanism is manually, mechanically, hydraulically, pneumatically, or electrically actuatable.

18. The twin tube damper as in claim 16, wherein said switchable flow valve comprises a rotatable spool valve, said rotatable spool valve defining a first fluid port and a second fluid port, wherein said first fluid port is in fluid communication with said first bypass flow passage and with said fluid reservoir, and said second fluid port is in fluid communication with said second bypass flow passage and said fluid reservoir when said switchable flow valve is switched to a least restrictive flow setting.

19. The twin tube damper as in claim 18, wherein said first fluid port and said second fluid port are at least partially blocked when said switchable flow valve is switched to a most restrictive flow setting.

20. The twin tube damper as in claim 16, wherein said switchable flow valve comprises a linearly actuated spool valve, said linearly actuated spool valve comprising:
a. a first landing;
b. a second landing;
c. a spool flow passage; and
d. wherein said first landing at least partially blocks said first bypass flow passage and said second landing block at least partially blocks said second bypass flow passage when said switchable flow control valve is switched to a most restrictive flow setting, and said first bypass flow passage and said second bypass flow passage are in fluid communication with said spool flow passage and said spool flow passage is in fluid communication with said common flow passage when said switchable flow control valve is switched to a least restrictive flow setting.

* * * * *